US012560436B2

(12) United States Patent
Lou

(10) Patent No.: US 12,560,436 B2
(45) Date of Patent: Feb. 24, 2026

(54) NAVIGATION VIDEO GENERATION AND ACQUISITION METHODS AND APPARATUSES, SERVER, DEVICE, AND MEDIUM

(71) Applicant: Tencent Technology (Shenzhen) Company Limited, Shenzhen (CN)

(72) Inventor: Shuai Lou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 392 days.

(21) Appl. No.: 18/134,449

(22) Filed: Apr. 13, 2023

(65) Prior Publication Data

US 2023/0251094 A1 Aug. 10, 2023

Related U.S. Application Data

(63) Continuation of application No. PCT/CN2022/108262, filed on Jul. 27, 2022.

(30) Foreign Application Priority Data

Aug. 17, 2021 (CN) .......................... 202110940424.6

(51) Int. Cl.
*G01C 21/20* (2006.01)
*G06T 11/20* (2006.01)

(52) U.S. Cl.
CPC .......... *G01C 21/206* (2013.01); *G06T 11/203* (2013.01); *G06T 11/206* (2013.01); *G06T 2210/61* (2013.01)

(58) Field of Classification Search
CPC ... G01C 21/206; G06T 11/203; G06T 11/206; G06T 2210/61; G06T 19/003;
(Continued)

(56) References Cited

U.S. PATENT DOCUMENTS 9,891,072 B2 * 2/2018 Lynch ................ G01C 21/3694
9,961,507 B1 * 5/2018 Mendelson ........... H04W 4/029
(Continued)

FOREIGN PATENT DOCUMENTS

CN 101701827 A 5/2010
CN 104931037 A 9/2015
(Continued)

OTHER PUBLICATIONS

Tencent Technology, WO, PCT/CN2022/108262, Oct. 8, 2022, 4 pgs.
(Continued)

*Primary Examiner* — Frederick M Brushaber
(74) *Attorney, Agent, or Firm* — Morgan, Lewis & Bockius LLP

(57) ABSTRACT

Navigation video generation and acquisition methods and apparatuses, a server, a device, and a medium are provided, which relate to the field of navigation technologies. The method includes: receiving, from a terminal, a navigation video obtaining request, the navigation video obtaining request including a route origin and a route destination within an indoor scene; determining, based on the route origin and the route destination, one or more second sub-videos from one or more first sub-videos corresponding to a point of interest (POI) route relationship graph, the POI route relationship graph including a navigation route between at least two POIs in the indoor scene; determining an identifier to a navigation video from the route origin to the route destination based on the one or more second sub-videos; and returning the identifier to the navigation video to the requesting terminal for displaying the navigation video at the terminal.

11 Claims, 9 Drawing Sheets

Video acquisition device 130 — First sub-video → Cloud server 120 ← Navigation video obtaining request — Navigation video → Terminal 110

(58) Field of Classification Search
CPC ....... G11B 27/031; H04N 5/265; G06F 16/29; G06F 16/787
See application file for complete search history.

(56) References Cited

U.S. PATENT DOCUMENTS

| | | | |
|---|---|---|---|
| 2002/0065605 A1* | 5/2002 | Yokota | G01C 21/3682 |
| | | | 340/995.22 |
| 2007/0291986 A1 | 12/2007 | Jeong et al. | |
| 2008/0167799 A1 | 7/2008 | Geelen | |
| 2013/0162665 A1 | 6/2013 | Lynch | |
| 2013/0211718 A1* | 8/2013 | Yoo | G01C 21/206 |
| | | | 701/523 |
| 2013/0274958 A1* | 10/2013 | Uno | B60L 15/2009 |
| | | | 701/1 |
| 2014/0240350 A1* | 8/2014 | Chen | G01C 21/206 |
| | | | 345/633 |
| 2014/0277895 A1* | 9/2014 | Shankwitz | B62K 11/04 |
| | | | 701/23 |
| 2015/0095350 A1* | 4/2015 | Chen | G06F 16/29 |
| | | | 707/755 |
| 2015/0274159 A1* | 10/2015 | Lu | G01L 5/13 |
| | | | 180/65.265 |
| 2016/0007209 A1* | 1/2016 | Hohs | G01C 21/3841 |
| | | | 455/423 |
| 2016/0061622 A1 | 3/2016 | Ren et al. | |
| 2016/0192029 A1* | 6/2016 | Bergstrom | H04L 47/83 |
| | | | 709/219 |
| 2017/0015329 A1* | 1/2017 | Furukawa | G01P 13/00 |
| 2017/0082451 A1* | 3/2017 | Liu | G11B 27/031 |
| 2017/0241793 A1* | 8/2017 | Raab | G01C 21/3679 |
| 2018/0192249 A1* | 7/2018 | Lehtiniemi | H04W 4/025 |
| 2018/0218606 A1* | 8/2018 | Michalakis | G06V 10/225 |
| 2018/0367895 A1* | 12/2018 | Smith | H04R 3/005 |
| 2019/0251851 A1* | 8/2019 | Zhao | G06T 17/05 |
| 2021/0025727 A1* | 1/2021 | Barnes | G06T 7/73 |
| 2023/0184558 A1* | 6/2023 | Waychal | G01C 21/3647 |
| | | | 701/426 |

FOREIGN PATENT DOCUMENTS

| | | | |
|---|---|---|---|
| CN | 105222773 A | 1/2016 | |
| CN | 107402019 A | 11/2017 | |
| CN | 107952238 A | 4/2018 | |
| CN | 108020231 A | 5/2018 | |
| CN | 108398132 A | 8/2018 | |
| CN | 108592929 A | 9/2018 | |
| CN | 108731690 A | 11/2018 | |
| CN | 109520510 A | 3/2019 | |
| CN | 111858996 A | 10/2020 | |
| CN | 111896003 A | 11/2020 | |
| CN | 111998865 A | 11/2020 | |
| CN | 112665606 A | 4/2021 | |
| CN | 113178006 A | 7/2021 | |
| CN | 113395462 A | 9/2021 | |
| WO | WO 2021090219 A1 | 5/2021 | |

OTHER PUBLICATIONS

Tencent Technology, IPRP, PCT/CN2022/108262, Feb. 13, 2024, 5 pgs.

Kang Jianchu et al., "Research on Navigation Terminal Oriented POI Compression and Retrieval", 2008 International Conference on Advanced Computer Theory and Engineering, Jan. 6, 2009, 3 pgs, Retrieved from the Internet:https://ieeexplore.ieee.org/document/4736993.

Tencent Technology, ISR, PCT/CN2022/108262, Oct. 8, 2022, 3 pgs.

* cited by examiner

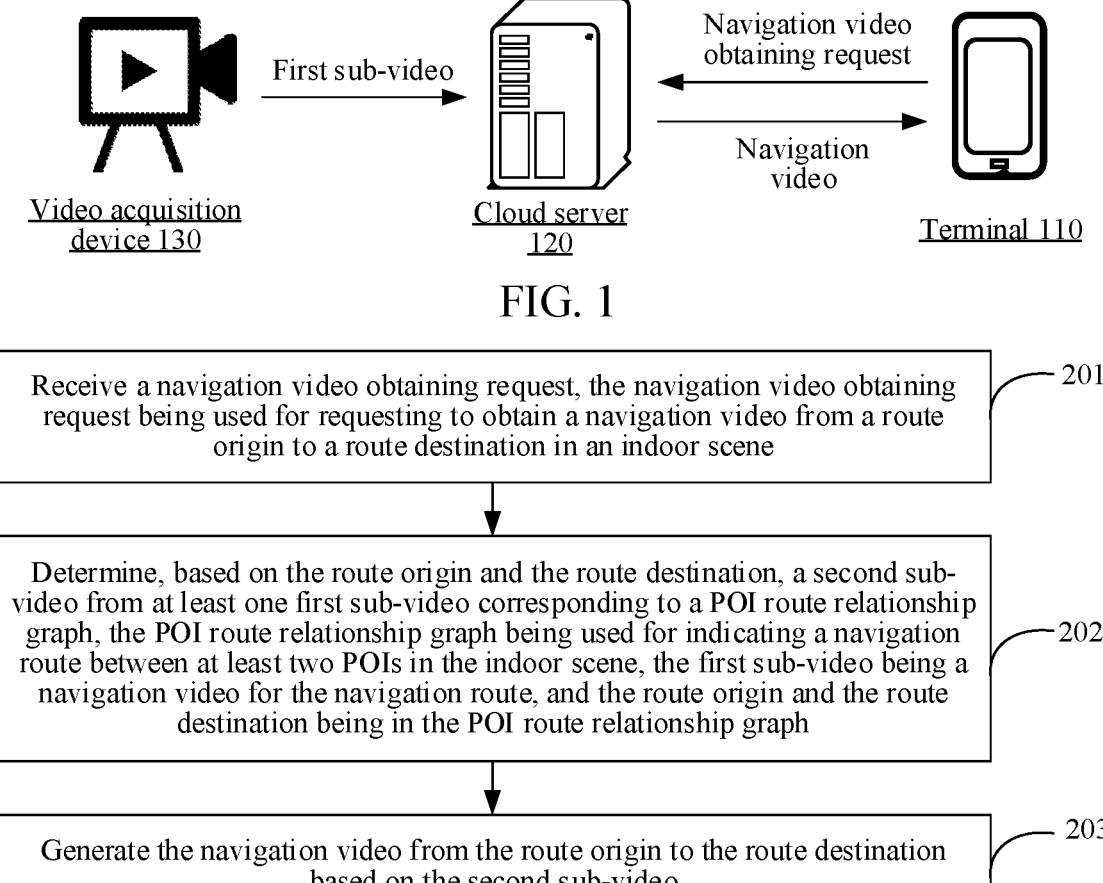

FIG. 1

Receive a navigation video obtaining request, the navigation video obtaining request being used for requesting to obtain a navigation video from a route origin to a route destination in an indoor scene

— 201

Determine, based on the route origin and the route destination, a second sub-video from at least one first sub-video corresponding to a POI route relationship graph, the POI route relationship graph being used for indicating a navigation route between at least two POIs in the indoor scene, the first sub-video being a navigation video for the navigation route, and the route origin and the route destination being in the POI route relationship graph

— 202

Generate the navigation video from the route origin to the route destination based on the second sub-video

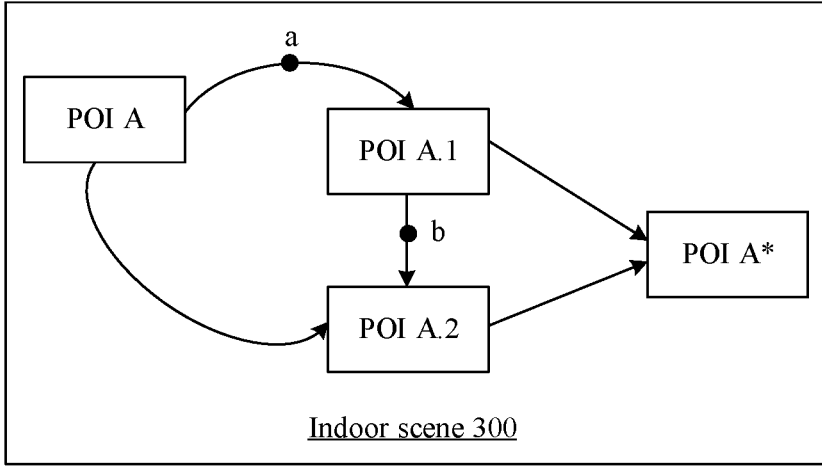

FIG. 3

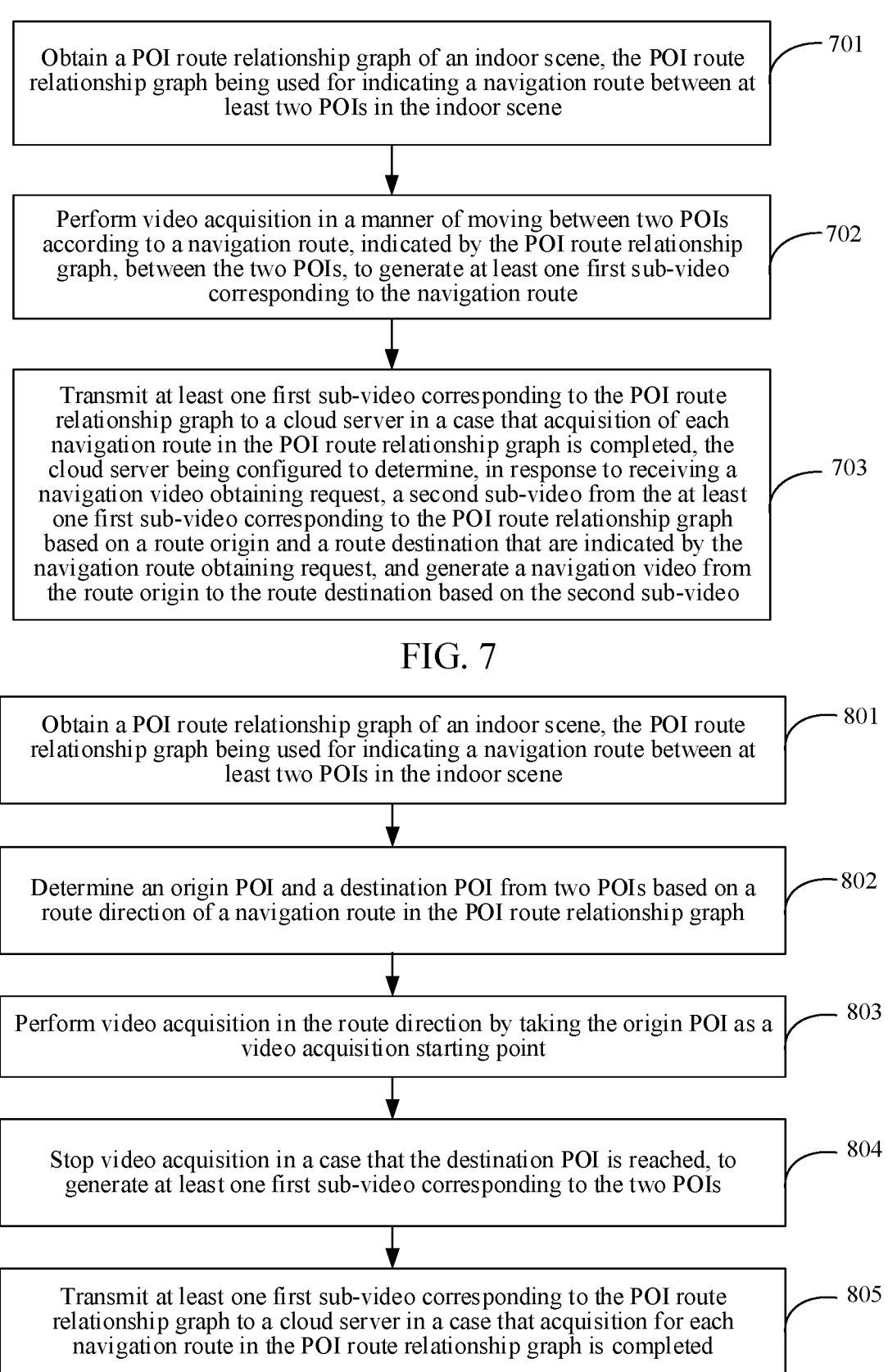

Obtain a POI route relationship graph of an indoor scene, the POI route relationship graph being used for indicating a navigation route between at least two POIs in the indoor scene ⟋ 701

Perform video acquisition in a manner of moving between two POIs according to a navigation route, indicated by the POI route relationship graph, between the two POIs, to generate at least one first sub-video corresponding to the navigation route ⟋ 702

Transmit at least one first sub-video corresponding to the POI route relationship graph to a cloud server in a case that acquisition of each navigation route in the POI route relationship graph is completed, the cloud server being configured to determine, in response to receiving a navigation video obtaining request, a second sub-video from the at least one first sub-video corresponding to the POI route relationship graph based on a route origin and a route destination that are indicated by the navigation route obtaining request, and generate a navigation video from the route origin to the route destination based on the second sub-video ⟋ 703

FIG. 7

Obtain a POI route relationship graph of an indoor scene, the POI route relationship graph being used for indicating a navigation route between at least two POIs in the indoor scene ⟋ 801

Determine an origin POI and a destination POI from two POIs based on a route direction of a navigation route in the POI route relationship graph ⟋ 802

Perform video acquisition in the route direction by taking the origin POI as a video acquisition starting point ⟋ 803

Stop video acquisition in a case that the destination POI is reached, to generate at least one first sub-video corresponding to the two POIs ⟋ 804

Transmit at least one first sub-video corresponding to the POI route relationship graph to a cloud server in a case that acquisition for each navigation route in the POI route relationship graph is completed ⟋ 805

FIG. 8

Computer device 1400

NAVIGATION VIDEO GENERATION AND ACQUISITION METHODS AND APPARATUSES, SERVER, DEVICE, AND MEDIUM

CROSS-REFERENCE TO RELATED APPLICATIONS

This application is a continuation application of PCT Patent Application No. PCT/CN2022/108262, entitled "DATA PROCESSING METHOD AND APPARATUS, TERMINAL DEVICE, AND COMPUTER STORAGE MEDIUM" filed on Jul. 27, 2022, which claims priority to Chinese Patent Application No. 202110940424.6, entitled "NAVIGATION VIDEO GENERATION AND ACQUISITION METHODS AND APPARATUSES, SERVER, DEVICE, AND MEDIUM" filed with the China National Intellectual Property Administration on Aug. 17, 2021, all of which is incorporated herein by reference in its entirety.

FIELD OF THE TECHNOLOGY

Embodiments of this application relate to the field of navigation technologies, and in particular, to navigation video generation and acquisition methods and apparatuses, a server, a device, and a medium.

BACKGROUND OF THE DISCLOSURE

With continuous development of Internet technology, a user is more and more accustomed to finding a destination through electronic navigation.

In the related art, an augmented reality (AR) navigation technology is derived by applying an AR technology to a navigation scene. AR navigation acquires a real road scene in real time, and adds a navigation route to a real scene picture, to present an intuitive three-dimensional (3D) navigation guidance for a user and provide immersive navigation experience.

However, a real scene picture acquired in real time is required in an AR navigation process. If the user needs to view an AR navigation picture corresponding to a specific indoor scene, the user needs to be in the indoor scene, and cannot preview the navigation picture.

SUMMARY

The embodiments of this application provide navigation video generation and acquisition methods and apparatuses, a server, a device, and a medium. The technical solutions are as follows.

According to an aspect of this application, a method for providing a navigation video is performed by a computer device. The method includes:

receiving, from a terminal, a navigation video obtaining request, the navigation video obtaining request including a route origin and a route destination within an indoor scene;

determining, based on the route origin and the route destination, one or more second sub-videos from one or more first sub-videos corresponding to a point of interest (POI) route relationship graph, the POI route relationship graph including a navigation route between at least two POIs in the indoor scene;

determining an identifier to a navigation video from the route origin to the route destination based on the one or more second sub-videos; and returning the identifier to the navigation video to the requesting terminal.

According to another aspect of this application, a computer device is provided. The computer device includes a processor and a memory. The memory stores at least one piece of computer program that, when executed by the processor, causes the computer device to implement the navigation video generation method as described in the foregoing aspect.

According to another aspect of this application, a non-transitory computer-readable storage medium is provided. The readable storage medium stores at least one piece of program that, when executed by a processor of a computer device, causes the computer device to implement the navigation video generation method as described in the foregoing aspect.

The technical solutions provided in the embodiments of this application have at least the following beneficial effects.

In an indoor navigation scene, a first sub-video corresponding to a navigation route between two POIs in the indoor scene is acquired in advance. When a user needs to request for a corresponding navigation video in the indoor scene, the first sub-video is screened based on a route origin and a route destination that are indicated in a navigation video request, to generate the navigation video required by the user. In an indoor navigation process, a panoramic picture in the indoor scene is acquired in advance, user equipment is not required to acquire the panoramic picture in real time. On one hand, this can reduce power consumption of the user equipment. On the other hand, the navigation video obtained by the user is not affected by a position of the user. That is, the user can view a navigation picture between any two positions in the indoor scene in advance even if outside the indoor scene. Therefore, the navigation video can be previewed, a reference is provided for the user to plan a route ahead, and application scenes of panoramic navigation are further enriched.

BRIEF DESCRIPTION OF THE DRAWINGS

FIG. 1 is a schematic diagram of an implementation environment according to an exemplary embodiment of this application.

FIG. 2 is a flowchart of a navigation video generation method according to an exemplary embodiment of this application.

FIG. 3 is a POI route relationship graph according to an exemplary embodiment of this application.

FIG. 7 is a flowchart of a navigation video acquisition method according to an exemplary embodiment of this application.

FIG. 8 is a flowchart of a navigation video acquisition method according to another exemplary embodiment of this application.

DESCRIPTION OF EMBODIMENTS

Figure 4:
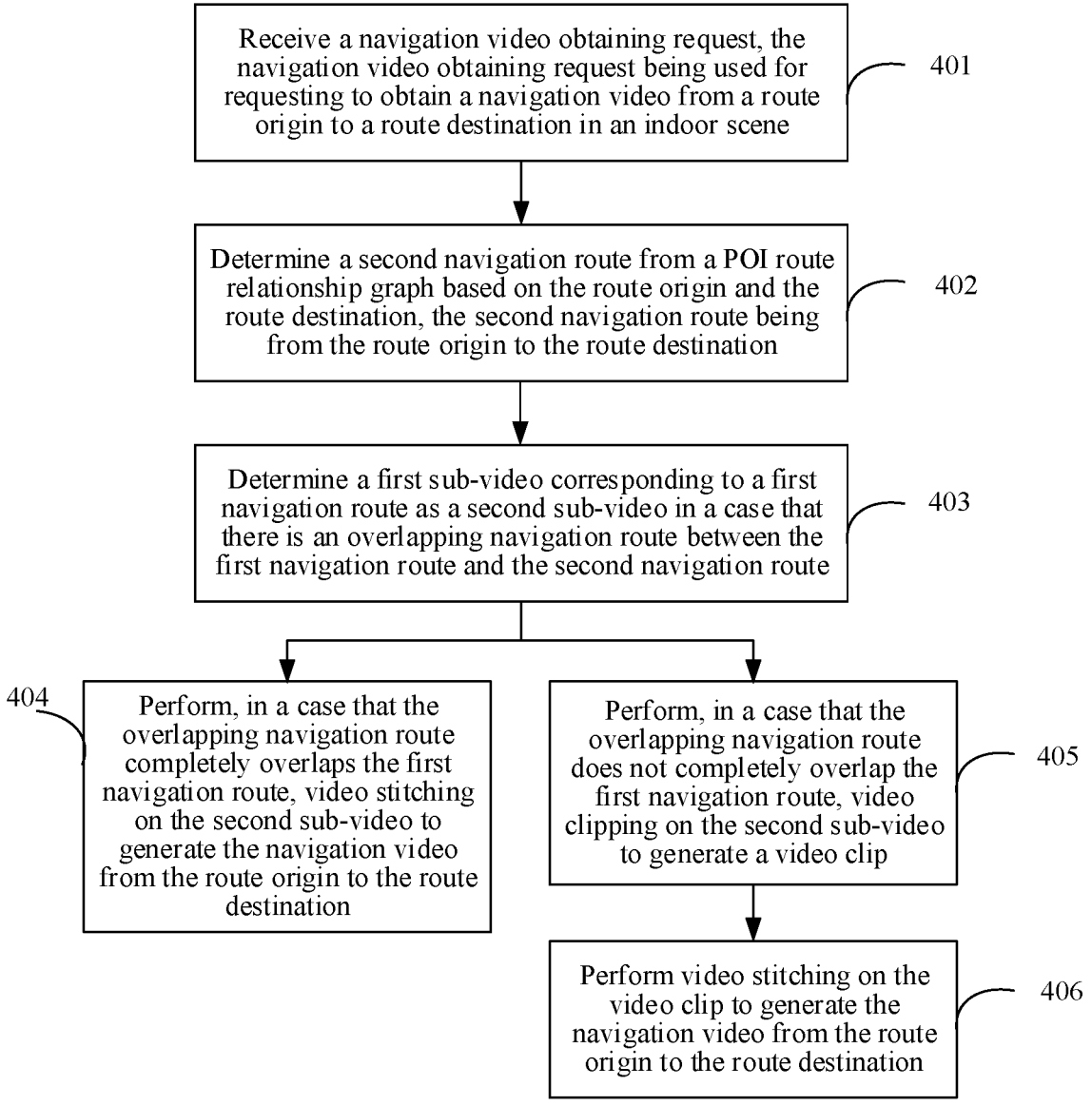
FIG. 4 is a flowchart of a navigation video generation method according to another exemplary embodiment of this application.

Terms involved in the embodiments of this application are first described briefly.

(1) POI: in a geographic information system, a POI may be a house, a shop, a mailbox, a bus station, or the like. Each POI includes four pieces of information: a name, a type, a longitude, and a latitude. Comprehensive POI information is necessary to enrich a navigation map. A timely POI can remind a user of detailed information about branches of road conditions and surrounding buildings and help find any place the user needs in navigation and select the fastest and smoothest roads for path planning. Therefore, POIs in a navigation map may directly affect convenience in navigation to some extent. In the embodiments of this application, panoramic navigation is for indoor application scenes. Therefore, a POI is a POI in an indoor scene, and may be a shop, an elevator, a stairway, an escalator, or the like in each indoor scene.

(2) Directed acyclic graph (DAG): in a graph theory, a directed graph is a directed acyclic graph if a route starting from a specific vertex cannot go back to this vertex after passing through a plurality of edges. In this embodiment, a directed acyclic graph (a POI route relationship graph) between each POI in an indoor scene is constructed based on navigation data in the indoor scene so as to avoid repeated acquisition of a panoramic video between two POIs. That is, in the POI route relationship graph, a navigation route between two POIs is directional to some extent. For example, for a navigation route between a POI A and a POI B, only a navigation video corresponding to a navigation route taking the POI A as an origin and the POI B as a destination is acquired.

Unlike an AR navigation process in the related art in which user equipment is required to acquire a real scene picture in front, an embodiment of this application provides a novel navigation video generation method. Refer to FIG. 1. FIG. 1 is a schematic diagram of an implementation environment according to an exemplary embodiment of this application. The implementation environment includes a terminal 110, a cloud server 120, and a video acquisition device 130.

The video acquisition device 130 is a device with an image acquisition or video acquisition function, which may be a device with an automatic video acquisition function, for example, a remote control automobile with a camera, an intelligent robot, or an unmanned aerial vehicle. In this embodiment of this application, the video acquisition device 130 may perform panoramic video acquisition on an indoor scene according to a navigation route indicated by a POI route relationship graph based on a set track or manual background control. In some embodiments, the video acquisition device 130 may periodically upload an acquired panoramic video (first sub-video) to the cloud server 120.

The video acquisition device 130 is directly or indirectly connected to the cloud server 120 through wired or wireless communication.

The cloud server 120 is a cloud computing resource pool in the field of cloud technologies. Various types of virtual resources are deployed in the resource pool for an external client to select and use. The cloud computing resource pool mainly includes a computing device (a virtual machine, including an operating system), a storage device, and a network device. The cloud server may be an independent physical server, or a server cluster or distributed system including a plurality of physical servers, or a cloud server providing a basic cloud computing service such as a cloud service, a cloud database, cloud computing, a cloud function, cloud storage, a network service, cloud communication, a middleware service, a domain name service, a security service, a content delivery network (CDN), or a big data and artificial intelligence platform. In this embodiment of this application, the cloud server 120 may receive a plurality of panoramic videos (first sub-videos) that are transmitted by the video acquisition device 130 and that correspond to the indoor scene, and store the panoramic videos in association with the POI route relationship graph corresponding to the indoor scene. In some embodiments, in an application process, the cloud server 120 may receive a navigation video obtaining request transmitted by the terminal 110, generate, based on the navigation video obtaining request and the plurality of first sub-videos, a navigation video indicated by the navigation video obtaining request, and feed back the navigation video to the terminal 110.

The terminal 110 is a device running a navigation application program, which may be a smartphone, a tablet computer, a notebook computer, a desktop computer, a smart speaker, or the like. In this embodiment of this application, when a user is in a non-indoor scene, or a user is in the indoor scene, a panoramic navigation video between any two positions (a route origin and a route destination) in the indoor scene may be obtained. That is, the terminal may determine the route origin and the route destination based on an input of the user, and transmit a navigation video obtaining request to the cloud server 120 to request for the corresponding navigation video from the route origin to the route destination. In some embodiments, after receiving the navigation video fed back by the cloud server 120, the terminal 110 may display the navigation video on a current user interface.

In the embodiments of this application, application of the navigation video generation method to the cloud server 120 is used as an example for description, and application of a navigation video acquisition method to the video acquisition device 130 is used as an example for description.

Refer to FIG. 2. FIG. 2 is a flowchart of a navigation video generation method according to an exemplary embodiment of this application. In this embodiment of this application, application of the method to the cloud server shown in FIG. 1 is used as an example for description. The method includes the following steps.

Step 201: Receive a navigation video obtaining request, e.g., from a terminal 110, the navigation video obtaining request being used for requesting to obtain a navigation video from a route origin to a route destination in an indoor scene.

An application scene of this embodiment of this application may include a preview scene and an online navigation scene. The preview scene is that a user may preview a navigation video between any two positions in an indoor scene when in another region except the indoor scene. Schematically, the user wants to preview a navigation video from an entrance of a shopping mall A to a target restaurant in the shopping mall when in a subway. A real-time navigation scene is that the user may obtain a navigation video from a current position to a target position in the indoor scene when in the indoor scene. Schematically, the user wants to obtain a navigation video from a current position to a target restaurant when in the shopping mall A.

In some embodiments, a navigation function shown in this embodiment of this application may be integrated into an existing navigation application program of a terminal. Alternatively, a new navigation application program is independently set to provide the navigation function in the preview scene and the online navigation scene.

In a possible implementation, the user may input the route origin and the route destination in the navigation application program. After a submission control or a navigation video obtaining control is tapped, the terminal determines that the user needs to obtain the navigation video from the route origin to the route destination, generates a navigation video obtaining request based on the route origin and the route destination, and transmit the navigation video obtaining request to the cloud server. Accordingly, the cloud server receives the navigation video obtaining request transmitted by the terminal, and generates the corresponding navigation video based on the navigation video obtaining request.

The navigation video obtaining request may include the route origin and the route destination. In some embodiments, the navigation video obtaining request may further include a scene name corresponding to the indoor scene, such that the server may find the navigation video corresponding to the indoor scene faster. In some embodiments, the scene name corresponding to the indoor scene may be determined by the terminal based on the route origin and the route destination. For example, if the route origin is a restaurant A, the route destination is a restaurant B, and both the restaurant A and the restaurant B are in the shopping mall A, the corresponding indoor scene is the shopping mall A. In some embodiments, the scene name corresponding to the indoor scene may be determined by the cloud server. After receiving the navigation video obtaining request, the cloud server determines the scene name based on the route origin and the route destination in the navigation video obtaining request. This is not limited in this embodiment of this application.

Step 202: Determine, based on the route origin and the route destination, a second sub-video from at least one first sub-video corresponding to a POI route relationship graph, the POI route relationship graph being used for indicating a navigation route between at least two POIs in the indoor scene, the first sub-video being a navigation video for the navigation route, and the route origin and the route destination belonging to the POI route relationship graph.

The POI route relationship graph is constructed in advance based on the navigation route between the POIs in the indoor scene. That is, the navigation route between the POIs in the indoor scene may be known based on the POI route relationship graph. For example, if it is possible to reach a POI B from a POI A, the POI route relationship graph may directly show a navigation route from the POI A to the POI B. In some embodiments, the POI may be a landmark building in the indoor scene. Schematically, if the indoor scene is a shopping mall, the POI may be each shop, an elevator, a stairway, an escalator, or another building.

Schematically, FIG. 3 is a POI route relationship graph according to an exemplary embodiment of this application.

An indoor scene 300 includes a POI A, a POI A.1, a POI A.2, a POI A*, and another POI. A POI route relationship graph corresponding to the indoor scene 300 is constructed based on position information of each POI in the indoor scene and route information. It can be seen from the POI route relationship graph that a possible navigation route from the POI A to the POI A* is POI A-POI A.1-POI A*, POI A-POI A.2-POI A*, POI A-POI A.1-POI A.2-POI A*, POI A-POI A.2-POI A.1-POI A*, or the like.

Since a navigation route relationship between the POIs in the indoor scene is complex, to more comprehensively cover the indoor scene without repetition, the POI route relationship graph capable of representing the navigation route relationship between the POIs in the indoor scene is constructed, and video acquisition is performed based on the POI route relationship graph to generate the first sub-video corresponding to each navigation route in the POI route relationship graph. This can not only acquire panoramic videos (that is, a plurality of first sub-videos) corresponding to various possible navigation routes in the indoor scene in advance but also avoid any POI in the indoor scene being omitted.

A process in which video acquisition is performed based on the POI route relationship graph may refer to the following embodiments, and will not be elaborated in this embodiment.

The route origin and the route destination that are selected by the user are not POIs in the indoor scene, and the route origin and the route destination are not exactly an origin and a destination in the POI route relationship graph. Therefore, to facilitate subsequent accurate generation of the corresponding navigation video, in a possible implementation, the second sub-video related to the navigation route from the route origin to the route destination is required to be determined from the plurality of first sub-videos according to positions of the route origin and the route destination in the POI route relationship graph, to further generate the matched navigation video based on the second sub-video.

Schematically, the POI route relationship graph of the indoor scene is shown in FIG. 3. The first sub-video acquired based on the POI route relationship graph includes totally five first sub-videos: a first sub-video A (corresponding to a navigation route of POI A-POI A.1), a first sub-video B (corresponding to a navigation route of POI A-POI A.2), a first sub-video C (corresponding to a navigation route of POI A.1-POI A.2), a first sub-video D (corresponding to a navigation route of POI A.1-POI A*), and a first sub-video E (corresponding to a navigation route of POI A.2-POI A*). If the route origin is the POI A, and the route destination is the POI A.2, based on the route origin and the route destination, it can be seen from the POI route relationship graph that a possible navigation route from the POI A to the POI A.2 is POI A-POI A.2, or POI A-POI A.1-POI A.2. In this case, at least a first sub-video corresponding to POI A-POI A.2 or POI A-POI A.1-POI A.2 is required to generate the corresponding navigation video from the route origin to the route destination. Accordingly, the first sub-video B is determined as the second sub-video, or the first sub-video and the first sub-video C are determined as second sub-videos.

Step 203: Generate the navigation video from the route origin to the route destination based on the second sub-video.

In a possible implementation, after determining the second sub-video related to the route origin and the route destination, the cloud server may generate the navigation video from the route origin to the route destination based on the second sub-video, and further feed back the generated navigation video to the terminal. In some embodiments, the cloud server determines an identifier (e.g., a hyperlink) to the navigation video from the route origin to the route destination based on the one or more second sub-video and returns the identifier to the navigation video to the requesting terminal.

In some embodiments, if the route origin and the route destination are two POIs in the POI route relationship graph, video stitching may be directly performed on the at least one second sub-video according to a route sequence to generate the corresponding navigation video. If at least one of the route origin and the route destination is between two POIs, video clipping processing is required to be performed on the second sub-video based on the position of the route origin or the route destination, to further generate the navigation video by stitching based on a video clip obtained by clipping.

Schematically, as shown in FIG. 3, the first sub-video corresponding to the POI route relationship graph includes totally five first sub-videos: a first sub-video A (POI A-POI A.1), a first sub-video B (POI A-POI A.2), a first sub-video C (POI A.1-POI A.2), a first sub-video D (POI A.1-POI A*), and a first sub-video E (POI A.2-POI A*). If the route origin is the POI A, and the route destination is POI A.2, the second sub-video determined from the five first sub-videos corresponding to the POI route relationship graph based on the route origin and the route destination may be the first sub-video B, or the first sub-video A and the first sub-video C. Accordingly, the first sub-video B may be directly determined as the corresponding navigation video from the route origin to the route destination. Alternatively, video stitching may be performed on the first sub-video A and the first sub-video C to generate the corresponding navigation video from the route origin to the route destination.

In some embodiments, after the corresponding navigation video is generated, to prompt the user of the navigation route more clearly, an indicating arrow may further be added to the navigation video to further indicate a travel direction to the user.

In some embodiments, the navigation video may involve a POI except the route origin and the route destination. In this case, involved POI information may be added to the navigation video, to help the user learn POIs that the navigation route from the route origin to the route destination may pass through. Schematically, the POI information includes at least a POI name, and may further include other related information.

In some embodiments, after the corresponding navigation video from the route origin to the route destination is generated, the navigation route may further be stored in the cloud server in association with the route origin and the route destination. If the cloud server subsequently receives a navigation video obtaining request transmitted by another terminal, and the navigation video obtaining request is also for obtaining the navigation video from the route origin to the route destination, the navigation video may be directly fed back to the terminal without repeating the process of generating the navigation video based on the first sub-video. In some embodiments, if a navigation route corresponding to the required navigation video in the navigation video obtaining request is a partial navigation route in the navigation video, video clipping may be directly performed on the navigation video based on the POI route relationship graph without repeating the process of generating the navigation video based on the first sub-video.

The first sub-video in this embodiment is a 3D panoramic video acquired in advance in real time by a video acquisition device.

In summary, in this embodiment of this application, in an indoor navigation scene, a first sub-video corresponding to a navigation route between two POIs in the indoor scene is acquired in advance. When a user needs to request for a corresponding navigation video in the indoor scene, the first sub-video is screened based on a route origin and a route destination that are indicated in a navigation video request, to generate the navigation video required by the user. In an indoor navigation process, a panoramic picture in the indoor scene is acquired in advance, user equipment is not required to acquire the panoramic picture in real time. On one hand, this can reduce power consumption of the user equipment. On the other hand, the navigation video obtained by the user is not affected by a position of the user. That is, the user can view a navigation picture between any two positions in the indoor scene in advance even if outside the indoor scene. Therefore, the navigation video can be previewed, a reference is provided for the user to plan a route ahead, and application scenes of panoramic navigation are further enriched.

Since the route origin and the route destination that are input by the user are not POIs in the POI route relationship graph, and the first sub-video is acquired in a manner of moving between the two POIs, if the route destination is at a position between the two POIs, the first sub-video is required to be clipped to accurately generate the corresponding navigation video from the route origin to the route destination.

In an example, FIG. 4 is a flowchart of a navigation video generation method according to another exemplary embodiment of this application. In this embodiment of this application, application of the method to the cloud server shown in FIG. 1 is used as an example for description. The method includes the following steps.

Step 401: Receive a navigation video obtaining request, the navigation video obtaining request being used for requesting to obtain a navigation video from a route origin to a route destination in an indoor scene.

An implementation of step 401 may refer to step 201, and will not be elaborated in this embodiment.

Step 402: Determine a second navigation route from a POI route relationship graph based on the route origin and the route destination, the second navigation route being from the route origin to the route destination.

Due to complexity of navigation routes between the POIs in the indoor scene, to facilitate subsequent determining of a related second sub-video from the route origin and the route destination from a plurality of first sub-videos, in a possible implementation, the corresponding second navigation route from the route origin to the route destination is first determined based on the POI route relationship graph, and the related second sub-video is further screened from the plurality of first sub-videos based on the second navigation route. In a process in which the second navigation route is determined, positions of the route origin and the route destination in the POI route relationship graph may be determined to further determine the corresponding second navigation route from the route origin to the route destination based on a navigation route indicated by the POI route relationship graph.

In some embodiments, since there may be a plurality of navigation routes between two POIs in the indoor scene, to reduce a processing burden of the cloud server, the second navigation route may be determined from a plurality of navigation routes based on a navigation policy to further generate the corresponding navigation video based on the second navigation route. The navigation policy may be a shortest path policy, that is, a navigation route with a smallest route length is selected as the second navigation route.

Schematically, positions of a route origin a and a route destination b in the POI route relationship graph are as shown in FIG. 3: the route origin a is between the POI A and the POI A.1, and the route destination b is between the POI A.1 and the POI A.2. In this case, it can be seen from the POI route relationship graph that a possible navigation route from the route origin a to the route destination b includes a-POI A.1-b, a-POI A-POI A.2-b, a-POI A.1-POI A*-POI A.2-b, and the like. Based on the shortest path policy, the navigation route a-POI A.1-b may be determined as a second navigation route.

In some embodiments, when the second navigation route is selected, a POI route relationship may be combined for selection. Since the first sub-video is acquired based on the POI route relationship graph, and the POI route relationship graph is a directed acyclic topological graph, that is, each first sub-video is acquired according to a route direction indicated by the POI route relationship graph, if the second navigation route is opposite to the route direction indicated by the POI route relationship graph, the first sub-video is required to be further processed. In order to reduce processing pressure of the cloud server and avoid subsequent processing of the first sub-video as much as possible, a navigation route consistent with the route direction indicated by the POI route relationship graph may be selected as the second navigation route, or a route less inconsistent with the route direction indicated by the POI route relationship graph may be selected as the second navigation route. In this case, based on this selection policy, for the three navigation routes of a-POI A.1-b, a-POI A-POI A.2-b, and a-POI A.1-POI A*-POI A.2-b, a route direction of a-POI A.1-b is consistent with that indicated by the POI route relationship graph, a-POI A.1-b is preferentially determined as the second navigation route.

Since the second navigation route selected by the server based on the navigation policy may be different from that expected by a user, when there are a plurality of corresponding navigation route from the route origin to the route destination, different navigation videos are directly generated according to the plurality of navigation routes without screening based on the navigation policy, and the different navigation videos are further fed back to the terminal user, for the user to determine a navigation route to be selected. In this way, more diversified panoramic video navigation is provided for the user.

Step 403: Determine a first sub-video corresponding to a first navigation route as the second sub-video when there is an overlapping navigation route between the first navigation route and the second navigation route.

Different first sub-videos correspond to different first navigation routes. In order to determine, from the plurality of first sub-videos, the second sub-video that may be used for generating the navigation video, in a possible implementation, each first navigation route may be compared with the second navigation route to determine whether there is an overlapping navigation route. If there is the overlapping navigation route, the first sub-video corresponding to the first navigation route is determined as the second sub-video.

Figures 5, 6:
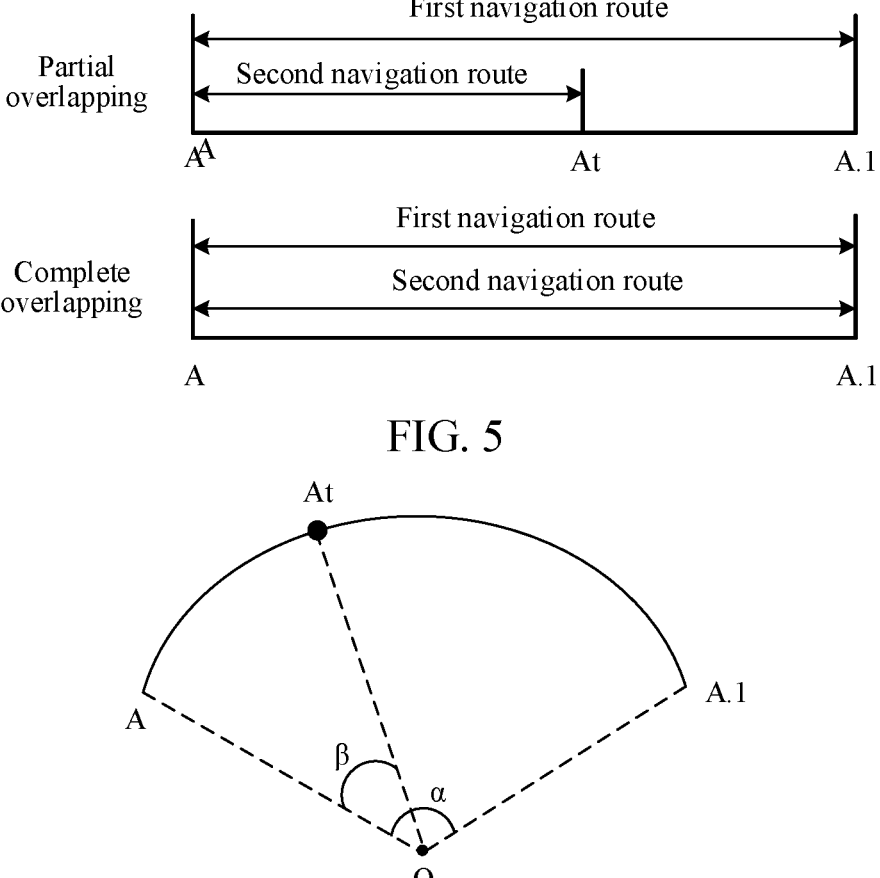
FIG. 5 is a schematic diagram of an overlapping navigation route according to an exemplary embodiment of this application.
FIG. 6 is a schematic diagram of a relationship between a first navigation route and an overlapping navigation route according to an exemplary embodiment of this application.

There are two overlapping relationships between the first navigation route and the second navigation route. Correspondingly, there are two cases for the overlapping navigation route. In one case, the first navigation route is completely included in the second navigation route (complete overlapping), and then the overlapping navigation route is the entire first navigation route. In the other case, the first navigation route partially overlaps the second navigation route, and then the overlapping navigation route is a part of the first navigation route. Schematically, FIG. 5 is a schematic diagram of the overlapping navigation route according to an exemplary embodiment of this application. In a complete overlapping scene, a second navigation route formed by a route origin A and a route destination At overlaps the first navigation route, and then the first navigation route is an overlapping navigation route. In a partial overlapping scene, the second navigation route is a part of the first navigation route, and then the overlapping navigation route is the second navigation route.

No matter whether the first navigation route completely overlaps the second navigation route, if there is the overlapping navigation route between the first navigation route and the second navigation route, it indicates that the first sub-video corresponding to the first navigation route includes a video clip that may be used for generating the corresponding navigation video from the route origin to the route destination. Therefore, in a possible implementation, if it is determined that there is the overlapping navigation route between the first navigation route and the second navigation route, the first sub-video corresponding to the first navigation route may be determined as the second sub-video.

In some embodiments, in an acquisition process of the first sub-video, origin position information and destination position information of the first navigation route corresponding to the first sub-video are determined and marked in the first sub-video so as to determine, in an application process, whether there is the overlapping navigation route between the first navigation route and the second navigation route.

In some embodiments, in order to reduce acquisition costs of a video acquisition device, the POI route relationship graph uses the directed acyclic topological graph. That is, only a unidirectional navigation route from one POI to another POI is constructed in the POI route relationship graph. Therefore, the first navigation route corresponding to the first sub-video acquired based on the POI route relationship graph is directional. However, in an actual generation process of the navigation video, a route direction of the second navigation route may be opposite to that of the first navigation route. For example, if the first navigation route is POI A-POI A.1, the video acquisition device acquires a first sub-video corresponding to POI A-POI A.1, but the second navigation route is POI A.1-POI A. Therefore, to generate a reverse navigation video, in a possible implementation, the cloud server further stores a reverse sub-video corresponding to the first navigation route, the reverse sub-video being obtained by performing reversing and flipping processing on the first sub-video.

In a possible implementation, the first sub-video corresponding to the first navigation route is directly determined as the second sub-video when there is the overlapping navigation route between the first navigation route and the second navigation route and a route direction of the overlapping navigation route is the same as that of the first navigation route, and the subsequent navigation video is generated based on the second sub-video.

In some embodiments, the reverse sub-video corresponding to the first navigation route is determined as the second sub-video when there is the overlapping navigation route between the first navigation route and the second navigation route and a route direction of the overlapping navigation route is opposite to that of the first navigation route, the reverse sub-video being obtained by performing reversing and flipping processing on the first sub-video.

Schematically, as shown in FIG. 3, if the route origin is the POI A\*, and the route destination is the POI A.1, the first sub-video corresponding to the POI route relationship graph includes a first sub-video A (POI A-POI A.1), a first sub-video B (POI A-POI A.2), a first sub-video C (POI A.1-POI A.2), a first sub-video D (POI A.1-POI A\*), and a first sub-video E (POI A.2-POI A\*), and a reverse sub-video corresponding to the POI route relationship graph includes a reverse sub-video A (POI A.1-POI A), a reverse sub-video B (POI A.2-POI A), a reverse sub-video C (POI A.2-POIA.1), a reverse sub-video D (POI A\*-POI A.1), and a reverse sub-video E (POI A\*-POI A.2). If the second navigation route is POI A\*-POI A.1-POI A, the reverse sub-video D and the reverse sub-video A are determined as second sub-videos based on a relationship between the second navigation route and the first navigation route.

In some embodiments, a generation process of the reverse sub-video may be performed by the cloud server. After receiving the plurality of first sub-videos uploaded by the video acquisition device, the cloud server may perform reversing and flipping processing on each first sub-video to generate a reverse sub-video corresponding to each first sub-video. Alternatively, when receiving the navigation video obtaining request and required to obtain a navigation video opposite to the route direction indicated by the POI route relationship graph, the cloud server generates the corresponding reverse sub-video based on the first sub-video.

In some embodiments, the generation process of the reverse sub-video may be performed by the video acquisition device. That is, after acquiring the plurality of first sub-videos based on the POI route relationship graph, the video acquisition device may perform reversing and flipping processing on the first sub-videos to generate a reverse sub-video corresponding to each first sub-video, and further upload both the first sub-video corresponding to the POI route relationship graph and the reverse sub-video to the cloud server. This can reduce processing costs of the cloud server.

Step 404: Perform, when the overlapping navigation route completely overlaps the first navigation route, video stitching on the second sub-video to generate the navigation video from the route origin to the route destination.

In a possible implementation, if the overlapping navigation route completely overlaps each first navigation route, it indicates that the route origin and the route destination are any two POIs in the POI route relationship graph or the route origin and the route destination are an origin and a destination of the first navigation route. Accordingly, the second sub-video is not required to be clipped, and video stitching may be directly performed on the second sub-video according to a sequence indicated by the second navigation route, to generate the navigation video from the route origin to the route destination.

In some embodiments, if the overlapping navigation route completely overlaps one first navigation route, the second sub-video is directly determined as the navigation video. Schematically, FIG. 3 is used as an example. If the route origin is the POI A, the route destination is the POI A.1, and POI A-POI A.1 corresponds to the first sub-video A, the first sub-video A is directly determined as the navigation video from the route origin to the route destination.

In some embodiments, if the overlapping navigation route completely overlaps at least two first navigation routes, at least two second sub-videos are correspondingly determined. In this case, video stitching processing is required to be performed on the second sub-videos according to the route direction, to generate the navigation video. Schematically, FIG. 3 is used as an example. If the route origin is the POI A, the route destination is the POI A\*, the second navigation route is POI A-POI A.1-POI A\*, and a first sub-video corresponding to POI A-POI A.1-POI A\* includes the first sub-video A and the first sub-video D, video stitching processing is performed on the first sub-video A and the first sub-video D, thereby generating the navigation video.

In some embodiments, since each second sub-video are correspondingly labeled with a route origin and a route destination, when video stitching processing is performed on a plurality of second sub-videos, a position of each second sub-video is required to be determined according to route positions of the route origin and the route destination that correspond to each sub-video on the navigation route, and video stitching processing is further performed on the plurality of second sub-videos according to the positions to generate the navigation video.

Step 405: Perform, when the overlapping navigation route does not completely overlap the first navigation route, video clipping on the second sub-video to generate a video clip.

When the route origin or the route destination is between two POIs, or the route origin or the route destination is in middle of the navigation route corresponding to the first sub-video, the overlapping navigation route may not completely overlap the first navigation route. That is, only a partial video clip of the first sub-video (or the second sub-video) may be required to generate the navigation video. Therefore, in a possible implementation, after the second sub-video is screened, video clipping is further required to be performed on the second sub-video according to the actual second navigation route and the first navigation route corresponding to the second sub-video, to generate the video clip required to generate the navigation video.

The first sub-video (or the second sub-video) is acquired at a uniform speed in a video acquisition process. Accordingly, the required video clip may be captured from the second sub-video based on a relationship between the overlapping navigation route and the first navigation route.

During video clipping of the second sub-video, a specific video clipping manner is related to a route shape of the first navigation route. For example, when the first navigation route is a straight line, the clipping manner for the video clip is related to only a route length. If the first navigation route is a curve, the clipping manner for the video clip is further related to a central angle of a center corresponding to the curve. Processes of obtaining the video clip by clipping in the two cases will be described respectively in the following embodiments.

In an example, if the overlapping navigation route is a straight line, that is, the first navigation route is a straight line, the process of obtaining the video clip by clipping may include step 405A and step 405B. That is, step 405 may include step 405A and step 405B.

Step 405A: Determine first video clip duration based on a first route length, a second route length, and sub-video duration, the first route length being a route length of the overlapping navigation route, the second route length being a route length of the first navigation route, and the sub-video duration being video duration of the second sub-video.

The first sub-video or the second sub-video is acquired at a uniform speed in the video acquisition process. Therefore, in a possible implementation, video clip duration required to be captured from the second sub-video may be directly determined according to a route length relationship between the overlapping navigation route and the first navigation route.

The first video clip duration is determined through the following process: obtaining the first route length corresponding to the overlapping navigation route and the second route length of the first navigation route, a ratio relationship between the first route length and the second route length being approximate to that between the sub-video duration corresponding to the second sub-video and the first video clip duration corresponding to the video clip on the premise of uniform video acquisition; and determining, based on the ratio relationship between the first route length and the second route length, as well as the sub-video duration, the first video clip duration of the video clip obtained by clipping.

As shown in FIG. 5, if the route destination At is between the POI A and the POI A.1, POI A-POI A.1 corresponds to the second sub-video, and the overlapping navigation route is A–At (a straight line), a video clip corresponding to A–At is required to be captured from the second sub-video to determine a video clip corresponding to the overlapping navigation route. A calculation formula corresponding to the first video clip duration may be as shown in a formula (1):

$$T_1=[(At-A)/(A.1-A)]*T \qquad (1)$$

$T_1$ represents the first video clip duration. At–A represents the first route length of the overlapping navigation route. A.1–A represents the second route length of the first navigation route. T represents the sub-video duration corresponding to the second sub-video.

Step 405B: Perform video clipping on the second sub-video based on the first video clip duration to generate the video clip.

In a possible implementation, if the overlapping navigation route is a straight line, video clipping may be performed on the second sub-video based on the first video clip duration calculated based on the formula (1), to obtain the video clip corresponding to the first video clip duration in the second sub-video to generate the video clip for subsequent generation of the corresponding navigation video based on the video clip.

In some embodiments, in another possible implementation, if there are two or more second sub-videos, after video clipping is performed on the second sub-video, video stitching is further required to be performed based on the video clip and another unclipped second sub-video, to generate the navigation video. For example, if the second sub-video includes a second sub-video A, a second sub-video B, and a second sub-video C, video clipping is required to be performed on only the second sub-video C to obtain a video clip D in a video clipping phase, and after video clipping is completed, video stitching is further required to be performed on the second sub-video A, the second sub-video B, and the video clip D, to generate the navigation video from the route origin to the route destination.

In another example, if the overlapping navigation route is a curve, that is, the first navigation route is a curve, the process of obtaining the video clip by clipping may include step 405C to step 405F. That is, step 405 may alternatively include step 405C to step 405F.

Step 405C: Determine a curve center position and a first central angle of the first navigation route.

In a curve scene, if the relationship between the first navigation route and the overlapping navigation route is required to be determined by comparison, a relationship between central angle corresponding to the first navigation route and a central angle corresponding to the overlapping navigation route is required to be determined by comparison. Therefore, in a possible implementation, the curve center position and the first central angle that correspond to the first navigation route are required to be determined.

The curve center position is determined in the following manner: obtaining a candidate origin position and a candidate destination position that correspond to the first navigation route, obtaining the corresponding first central angle from the candidate origin position to the candidate destination position, and further determining, based on the first central angle, the candidate origin position, and the candidate destination position, the curve center position corresponding to the first navigation route.

In some embodiments, the first central angle is acquired by the video acquisition device through a disposed gyroscope when acquiring the first sub-video (the first sub-video corresponding to the first navigation route). The first central angle is uploaded to the cloud server in association with the first sub-video.

Step 405D: Determine a second central angle of the overlapping navigation route based on the overlapping navigation route and the curve center position.

In a possible implementation, when the curve center position is determined, the second central angle corresponding to the overlapping navigation route may be calculated based on a route origin position and a route destination position of the overlapping navigation route, and the curve center position.

Step 405E: Determine second video clip duration based on the second central angle, the first central angle, and sub-video duration, the sub-video duration being video duration of the second sub-video.

After the second central angle corresponding to the overlapping navigation route and the first central angle corresponding to the first navigation route are determined, since a ratio relationship between the first central angle and the second central angle is approximate to a relationship between the sub-video duration corresponding to the second sub-video and the second video clip duration, the ratio relationship between the second central angle and the first central angle is determined, and the second video clip duration of the video clip required to be captured is determined according to the ratio relationship and the sub-video duration corresponding to the second sub-video.

FIG. 6 is a schematic diagram of the relationship between the first navigation route and the overlapping navigation route according to an exemplary embodiment of this application. If the route destination At is between the POI A and the POI A.1, POI A-POI A.1 corresponds to the second sub-video, and the overlapping navigation route is A–At (a curve), a video clip corresponding to A–At is required to be captured from the second sub-video to determine a video clip corresponding to the overlapping navigation route. A calculation formula corresponding to the second video clip duration may be as shown in a formula (2):

$$T_2=(\beta/\alpha)*T \qquad (2)$$

$T_2$ represents the second video clip duration. $\beta$ represents the second central angle corresponding to the overlapping navigation route. $\alpha$ represents the first central angle corresponding to the first navigation route. T represents the sub-video duration corresponding to the second sub-video.

Step 405F: Perform video clipping on the second sub-video based on the second video clip duration to generate the video clip.

In a possible implementation, if the overlapping navigation route is a curve, video clip duration calculation may be performed based on the formula (2) to obtain the second video clip duration, and video clipping is performed on the second sub-video based on the second video clip duration to obtain the video clip corresponding to the second video clip duration in the second sub-video, thereby generating the video clip for subsequent generation of the navigation video based on the video clip.

Step 406: Perform video stitching on the video clip to generate the navigation video from the route origin to the route destination.

In a possible implementation, after the second sub-video is clipped to obtain the required video clip, the corresponding navigation video from the route origin to the route destination may be generated based on the video clip.

In some embodiments, if the second navigation route corresponds to one second sub-video, the video clip obtained by clipping may be directly determined as the navigation video. If the second navigation route corresponds to at least two second sub-videos, and only one second sub-video is required to be clipped, video stitching processing is performed on a video clip obtained by clipping and at least one second sub-video to generate the navigation video.

Schematically, as shown in FIG. 3, if the route origin is a, and the route destination is b, the first sub-video corresponding to the POI route relationship graph includes totally five first sub-videos: a first sub-video A (POI A-POI A.1), a first sub-video B (POI A-POI A.2), a first sub-video C (POI A.1-POI A.2), a first sub-video D (POI A.1-POI A*), and a first sub-video E (POI A.2-POI A*). In this case, the second sub-video determined based on the route origin and the route destination is the first sub-video A and the first sub-video C. Since both the route origin a and the route destination b are between two POIs, the first sub-video A and the second sub-video C are required to be clipped to obtain a video clip Aa (a-POI A.1) and a video clip Cb (POI A.1-POI b), and then video stitching processing is performed on the video clip Aa and the video clip Cb to obtain the corresponding navigation video from the route origin a to the route destination b.

In some embodiments, after the cloud server generates the corresponding navigation video from the route origin to the route destination, an index relationship between the navigation video and the route origin as well as the route destination may be established, such that the cloud server may directly fed back the associated navigation video to the terminal based on the index relationship when subsequently receiving a same navigation video obtaining request. In some embodiments, if a route origin and a route destination that are indicated in the subsequent navigation video obtaining request are the route destination and the route origin that correspond to the navigation route, reversing and flipping processing may be performed on the navigation video, and a processed navigation video is fed back to the terminal.

Schematically, if the route origin corresponding to the navigation video is a, and the route destination is b, the cloud server establishes an index relationship between a-b and a navigation video. If subsequently receiving a request for obtaining a navigation video from a route origin b to a route destination a, the cloud server may obtain the navigation video based on the index relationship, and perform reversing and flipping processing on the navigation video to generate the navigation video of b-a for feedback to the terminal.

In this embodiment, the second navigation route is determined from the POI route relationship graph based on the route origin and the route destination, and the second sub-video is further screened from the plurality of first sub-videos based on the relationship between the second navigation route and the first navigation relationship corresponding to each first sub-video, such that the cloud server may generate the corresponding navigation video for the second navigation route. This can avoid the cloud server generating different navigation videos because of many optional navigation routes, and reduce the processing pressure of the cloud server. In addition, in the case that the overlapping navigation route and the first navigation route are opposite in direction, the subsequent navigation video is generated based on the reverse sub-video generated by performing reversing and flipping processing on the first sub-video. This can avoid repeated acquisition of two POIs, and further reduce acquisition costs of the first sub-video.

In some embodiments, the navigation video generation method of this embodiment of this application may include the following step 601 to step 604:

Step 601: Receive a navigation video obtaining request, the navigation video obtaining request being used for requesting to obtain a navigation video from a route origin to a route destination in an indoor scene.

In a possible implementation, after a user inputs the route origin and the route destination in a navigation application of a terminal, and taps a search control, accordingly, the terminal transmits the navigation video obtaining request including the route origin and the route destination to the cloud server. Accordingly, the cloud server receives the navigation video obtaining request, generates the navigation video from the route origin to the route destination in the indoor scene based on the navigation video obtaining request, and feeds back the generated navigation video to the terminal.

Step 602: Determine a second navigation route from the route origin to the route destination from a POI route relationship graph based on the route origin and the route destination, the POI route relationship graph being used for indicating a navigation route between at least two POIs in the indoor scene, the POI route relationship graph corresponding to at least one first sub-video, different first sub-videos corresponding to different first navigation routes, the first sub-video being acquired during movement between two POIs, and the route origin and the route destination being on at least one navigation route in the POI route relationship graph.

The cloud server stores the POI route relationship graph corresponding to the indoor scene and a plurality of first sub-videos acquired based on the POI route relationship graph. Therefore, in a possible implementation, after receiving the navigation video obtaining request, the cloud server may determine the second navigation route from the route origin to the route destination from the POI route relationship graph based on the route origin and the route destination, and further perform screening based on the second navigation route to generate a second sub-video required to generate the navigation video.

Step 603: Determine a first sub-video corresponding to a first navigation route as the second sub-video when there is an overlapping navigation route between the first navigation route and the second navigation route.

Since different first sub-videos correspond to different first navigation routes, when the second sub-video is screened from the plurality of first sub-videos, the second sub-video is required to be screened based on a relationship between each first navigation route and the second navigation route. In a possible implementation, if there is an overlapping part (the overlapping part is an overlapping navigation route) between the first navigation route and the second navigation route, it indicates that a first sub-video corresponding to this part of first navigation route is required in a subsequent navigation video generation process, and accordingly, the first sub-video corresponding to the first navigation route is required to be determined as the second sub-video for subsequent generation of the navigation video.

Step 604: Generate the navigation video from the route origin to the route destination based on the second sub-video.

When the overlapping navigation route does not completely overlap the first navigation route, and the overlapping navigation route is a curve, the navigation video is generated by using a video clip. The video clip is obtained by clipping the second sub-video based on second video clip duration. The second video clip duration is determined based on a second central angle corresponding to the overlapping navigation route, a first central angle corresponding to the first navigation route, and sub-video duration corresponding to the second sub-video. The second central angle is determined based on the overlapping navigation route and a curve center position corresponding to the first navigation route.

In a possible implementation, after the second sub-video is screened from the first sub-video, video stitching or video clipping is further required to be performed on the second sub-video to generate the navigation video from the route origin to the route destination.

In some embodiments, when the overlapping navigation route does not completely overlap the first navigation route, for example, the overlapping navigation route is a partial navigation route of the first navigation route, video clipping is required to be performed on the first sub-video corresponding to the first navigation route to obtain the required video clip. The navigation route may not be completely a straight line or completely a curve, and a shape of the navigation route may affect a video clipping manner for the first sub-video. In order to improve video clipping accuracy, in a possible implementation, different manners for obtaining the video clip are pertinently set for a route shape of the overlapping navigation route. For example, when the overlapping navigation route is a curve, the curve center position and the first central angle that correspond to the first navigation route are obtained. The second central angle corresponding to the overlapping navigation route may be determined based on a route length of the overlapping navigation route and the curve center position. Since a ratio of the second central angle (the overlapping navigation route) to the first central angle (the first navigation route) may be approximate to a ratio of the second video clip duration of the video clip to the sub-video duration corresponding to the second sub-video, accordingly, the second video clip duration of the video clip to be obtained by clipping may be determined based on the second central angle, the first central angle, and the video duration of the second sub-video. After the second video clip duration is determined, video clipping is performed on the second sub-video based on the second video clip duration to obtain the video clip to further generate the navigation video.

How to generate the navigation video required by the user based on the first sub-video that is acquired in advance is mainly described in the foregoing embodiments. How to acquire the first sub-video based on the POI route relationship graph is mainly described in this embodiment.

Refer to FIG. 7. FIG. 7 is a flowchart of a navigation video acquisition method according to an exemplary embodiment of this application. In this embodiment of this application, application of the method to the video acquisition device shown in FIG. 1 is used as an example for description. The method includes the following steps.

Step 701: Obtain a POI route relationship graph of an indoor scene, the POI route relationship graph being used for indicating a navigation route between at least two POIs in the indoor scene.

A developer may construct the POI route relationship graph based on a route relationship between the POIs in the indoor scene, and input the POI route relationship graph to the video acquisition device, and accordingly, the video acquisition obtains the POI route relationship graph of the indoor scene. In some embodiments, the POI route relationship graph may be automatically generated by a computer device, that is, navigation data of each POI in the indoor scene is input to the computer device, the computer device may automatically construct the POI route relationship graph of the indoor scene based on the navigation data, and further input the POI route relationship graph to the video acquisition device, and accordingly, the video acquisition device obtains the POI route relationship graph corresponding to the indoor scene. The video acquisition device and the computer device are different devices. In some embodiments, the POI route relationship graph may be automatically generated by the video acquisition device, that is, navigation data corresponding to the indoor scene is input to the video acquisition device, and the video acquisition device automatically generates the corresponding POI route relationship graph.

In a possible implementation, after obtaining the POI route relationship graph of the indoor scene, the video acquisition device may automatically move to acquire a corresponding panoramic video (a first sub-video) based on the navigation route, indicated by the POI route relationship graph, between the POIs.

In order to make the first sub-video (the panoramic video) acquired by the video acquisition device consistent with a picture observed by a user when actually walking in the indoor scene, a video acquisition parameter of the video acquisition device is required to be consistent with that when the user walks in the indoor scene. The video acquisition parameter may be at least one of a video acquisition height, a video acquisition angle, and a video acquisition speed. Accordingly, the video acquisition height and the video acquisition angle are required to be consistent with a height of the user and an eye level of the user, to avoid the condition that the user cannot recognize a specific position due because the video acquisition height is excessively small or large. In addition, the user generally walks in the indoor scene, and accordingly, the video acquisition speed is required to be similar to a walking speed of the user, to avoid a subsequent real scene navigation failure caused by a high playback speed of a subsequently generated navigation video.

Step 702: Perform video acquisition in a manner of moving between two POIs according to a navigation route, indicated by the POI route relationship graph, between the two POIs, to generate at least one first sub-video corresponding to the navigation route.

The first sub-video is used for subsequently generating the navigation video, that is, the first sub-video is required to be consistent with a real scene picture seen by the user when walking in the indoor scene. Therefore, in a possible implementation, to acquire the first sub-video required by the user, when the first sub-video corresponding to the two POIs is acquired, video acquisition is required to be performed in the manner of moving between the two POIs according to the navigation route, indicated by the POI route relationship graph, between the two POIs, to generate the at least one first sub-video (panoramic video) corresponding to the navigation route.

Schematically, as shown in FIG. 3, if a first sub-video corresponding to the indoor scene 300 is required to be acquired, first sub-videos between five groups of POIs of POI A-POI A.1, POI A-POI A.2, POI A.1-POI A.2, POI A.1-POI A*, and POI A.2-POI A* are required to be acquired respectively. For the two POIs of POI A and POI A.1, a navigation route indicated by the POI route relationship graph is POI A-POI A.1, and the video acquisition device may perform video acquisition while moving from the POI A to the POI A.1 to obtain at least one first sub-video corresponding to the POI A and the POI A.1. By analogy, after acquisition of the five groups of POIs is completed, a plurality of first sub-videos corresponding to the POI route relationship graph may be obtained.

In some embodiments, in order to make the first sub-video more consistent with a navigation video acquired in real time when the user walks, the video acquisition device may be set to move at a constant speed for video acquisition, and a movement speed of the video acquisition device may be an average human walking speed.

Step 703: Transmit at least one first sub-video corresponding to the POI route relationship graph to a cloud server when acquisition of each navigation route in the POI route relationship graph is completed, the cloud server being configured to determine, in response to receiving a navigation video obtaining request, a second sub-video from the at least one first sub-video corresponding to the POI route relationship graph based on a route origin and a route destination that are indicated by the navigation route obtaining request, and generate a navigation video from the route origin to the route destination based on the second sub-video.

In a possible implementation, after completing acquiring the first sub-video of the indoor scene based on the POI route relationship graph, the video acquisition device may upload the plurality of first sub-videos and the corresponding POI route relationship graph to the cloud server. Accordingly, the cloud server receives and associatively stores the plurality of first sub-videos and the corresponding POI route relationship graph so as to generate a required navigation video based on the POI route relationship graph and the plurality of corresponding first sub-videos when subsequently receiving a navigation video obtaining request for the indoor scene.

In some embodiments, since each first sub-video corresponds to a different origin position and destination position, to enable the cloud server to subsequently find the required first sub-video accurately when generating the navigation video, when generating the first sub-video, the video acquisition device may label the first sub-video with an origin position and a destination position. Then, each first sub-video and the associated origin position and destination position may be uploaded to the cloud server together.

In some embodiments, when the indoor scene changes, the video acquisition device is required to reacquire a corresponding first sub-video, and upload the reacquired first sub-video to the cloud server, such that the cloud server may timely update the first sub-video to make a subsequently generated navigation video more consistent with a real scene picture in a current indoor scene.

A process in which the cloud server generates the navigation video based on the POI route relationship graph and the first sub-video may refer to the navigation video generation method in the foregoing embodiment, and will not be elaborated in this embodiment.

In summary, in this embodiment of this application, the video acquisition device acquires the plurality of first sub-videos corresponding to the POI route relationship graph in advance according to the POI route relationship graph corresponding to the indoor scene, and uploads the first sub-videos to the cloud server, such that when the user needs to request for the navigation video corresponding to the indoor scene, the cloud server may screen the first sub-videos based on the route origin and the route destination that are indicated in the navigation video obtaining request, to generate the navigation video required by the user. In an indoor navigation process, a panoramic picture in the indoor scene is acquired in advance, user equipment is not required to acquire the panoramic picture in real time. On one hand, this can reduce power consumption of the user equipment. On the other hand, the navigation video obtained by the user is not affected by a position of the user. That is, the user can view a navigation picture between any two positions in the indoor scene in advance even if outside the indoor scene. Therefore, the navigation video can be previewed, a reference is provided for the user to plan a route ahead, and application scenes of panoramic navigation are further enriched.

A navigation video generation process involves a process of clipping the acquired first sub-video, and a route shape of a first navigation route corresponding to the first sub-video may affect a clipping manner for the first sub-video. Therefore, to avoid use of different clipping manners for a single first sub-video, in a possible implementation, if there is a straight-line region and a curve region between two POIs, corresponding first sub-videos are acquired respectively for the straight-line region and the curve region.

In an example, FIG. 8 is a flowchart of a navigation video acquisition method according to another exemplary embodiment of this application. In this embodiment of this application, application of the method to the video acquisition device shown in FIG. 1 is used as an example for description. The method includes the following steps.

Step 801: Obtain a POI route relationship graph of an indoor scene, the POI route relationship graph being used for indicating a navigation route between at least two POIs in the indoor scene.

In this embodiment, an example in which the POI route relationship graph is generated by the video acquisition device is used for exemplary description. A generation process of the POI route relationship graph may include the following steps.

1: Obtain Navigation Data of the Indoor Scene.

The navigation data may be obtained by a navigation application program. The navigation data may include each POI in the indoor scene, position information corresponding to each POI, and a route relationship between the POIs.

In a possible implementation, if the navigation application program is run in the video acquisition device, the navigation data may be directly obtained from the navigation application program. If the navigation application program is not run in the video acquisition device, the obtained navigation data may be input to the video acquisition device, and accordingly, the video acquisition device obtains the navigation data corresponding to the indoor scene.

2: Generate the POI Route Relationship Graph of the Indoor Scene Based on the Navigation Data.

In a possible implementation, after obtaining the navigation data corresponding to the indoor scene, the video acquisition device may construct the navigation route between the POIs in the indoor scene based on the navigation data, to further generate the POI route relationship graph corresponding to the indoor scene.

In some embodiments, in order to reduce video acquisition costs of the video acquisition device, only a unidirectional first sub-video between two POIs is acquired, and accordingly, the constructed POI route relationship graph is a directed acyclic topological graph. That is, only a first sub-video corresponding to a unidirectional navigation route between the two POIs is acquired. A reverse first sub-video may be obtained by performing reversing and flipping processing on the acquired first sub-video.

In some embodiments, the indoor scene may include a plurality of floors. When the POI route relationship graph is constructed, a POI crossing floors is determined as a cross-floor node. The POI route relationship graph of the indoor scene is divided into different POI route relationship subgraphs by cross-floor nodes. Different POI route relationship subgraphs are associated and maintained through the cross-floor nodes.

Schematically, the cross-floor node may be a POI between two floors, for example, an elevator, an escalator, or a stairway.

Figure 9:
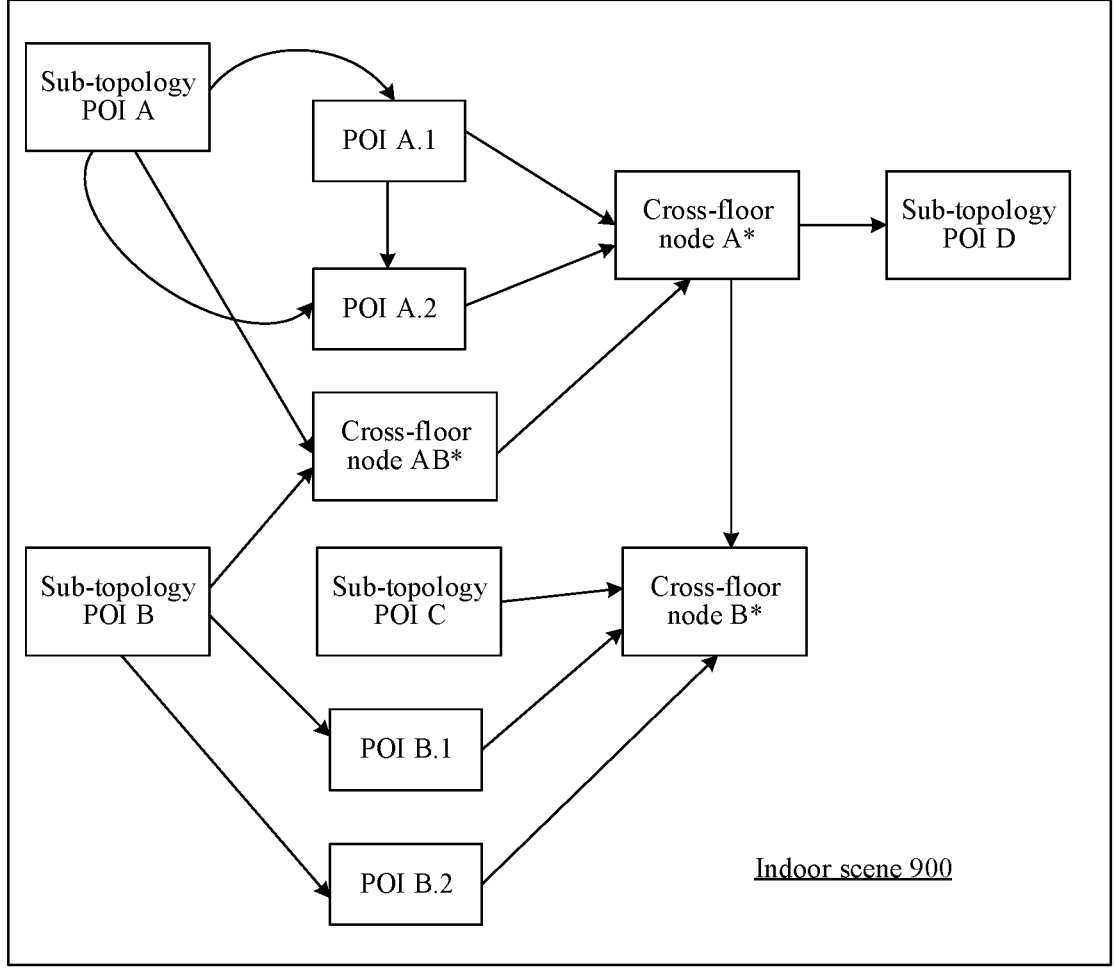
FIG. 9 is a POI route relationship graph according to another exemplary embodiment of this application.

Schematically, FIG. 9 is the POI route relationship graph according to another exemplary embodiment of this application. An indoor scene 900 includes four floors (A-B-C-D). Accordingly, the POI route relationship graph may be divided into four sub-topologies based on cross-floor nodes: a sub-topology POI A, a sub-topology POI B, a sub-topology POI C, and a sub-topology POI D. The sub-topology POI A may take a POI A as an origin and a cross-floor node A* as a destination.

In some embodiments, when the indoor scene includes cross-floor nodes, first video acquisition may be performed according to different POI route relationship subgraphs respectively. Then, a first sub-video between the cross-floor nodes is acquired. Further, first sub-videos corresponding to different POI route relationship subgraphs and the first sub-videos corresponding to the cross-floor nodes are used as all first sub-videos acquired in the indoor scene. In some embodiments, different POI route relationship subgraphs and corresponding first sub-videos may be associatively stored.

Step 802: Determine an origin POI and a destination POI from two POIs based on a route direction of a navigation route in the POI route relationship graph.

Since the POI route relationship graph is a directed acyclic topological graph, to make the acquired first sub-video the same as a navigation direction indicated in the POI route relationship graph, in a possible implementation, the video acquisition device is required to determine the origin POI and the destination POI from the two POIs based on the route direction of the navigation route indicated in the POI route relationship graph, to further perform video acquisition according to the route direction.

In some embodiments, the origin POI and the destination POI that correspond to the POI route relationship graph are further required to be determined before video acquisition, to further determine an overall route direction for video acquisition. When the indoor scene includes a plurality of floors, acquisition is generally performed for each floor. Accordingly, a cross-floor node may be determined as a destination POI or an origin POI.

Step 803: Perform video acquisition in the route direction by taking the origin POI as a video acquisition starting point.

In a possible implementation, after the origin POI and the destination POI that correspond to the POI route relationship graph are determined, the route direction between the POIs in the POI route relationship graph is determined. Further, for each group of POIs, an origin POI and a destination POI are determined based on the route direction, video acquisition is performed in the route direction by taking the origin POI as a video acquisition starting point, and when the destination POI is reached, an acquisition process of the first sub-video between the two POIs is completed.

Schematically, as shown in FIG. 9, if the origin POI corresponding to the sub-topology POI A is the POI A, the destination POI is the cross-floor node A*. Accordingly, first sub-videos between each group of POIs such as POI A-POI A.1, POI A-POI A.2, POI A.1-POI A.2, POI A.1-POI A*, and POI A.2-POI A* are required to be correspondingly acquired to acquire a first sub-video corresponding to a floor A. Accordingly, for POI A-POI A.1, video acquisition is performed in a direction from the POI A to a POI A.1 by taking the POI A as a video acquisition starting point based on the route direction indicated by the POI route relationship graph. When the POI A.1 is reached, an acquisition process of a first sub-video between the POI A and the POI A.1 is completed.

In a possible application scene, the route between the two POIs may be a straight line, or there may be a curve. In order to distinguish a curve region and a straight-line region, segmented acquisition may be performed between the two POIs according to the straight line and the curve. That is, there may be a plurality of first sub-videos between the two POIs. In an example, a video acquisition process between the two POIs may include the following steps (that is, step 803 may include step 803A to step 803C).

Step 803A: Obtain a current rotation angle of the video acquisition device in the video acquisition process.

In order to determine whether a current acquisition route is a curve, in a possible implementation, a gyroscope is disposed in the video acquisition device. Through the gyroscope, the current rotation angle of the video acquisition device may be detected in real time to further determine, based on the rotation angle, whether there is a turning route or the curve region between the two POIs.

In some embodiments, when the video acquisition device starts video acquisition, the gyroscope detects the rotation angle in real time. Accordingly, the video acquisition device obtains its own rotation angle to determine, based on the rotation angle, whether there is a turning route.

Step 803B: Determine an ith video acquisition interruption point when the rotation angle is greater than an angle threshold, and generate an ith first sub-video between the two POIs, i being a positive integer.

The angle threshold may be set by a developer. Schematically, the angle threshold may be 20 degrees.

In a possible implementation, when the video acquisition device determines in the video acquisition process that the current rotation angle is greater than the angle threshold, it indicates that the video acquisition device currently rotates a large angle, and may be on the turning route. In this case, the terminal stops first sub-video acquisition, generates the ith first sub-video between the two POIs, and determines a current position of the acquisition device as the ith video acquisition interruption point.

Step 803C: Continue to perform video acquisition from the ith video acquisition interruption point, determine an (i+1)th video acquisition interruption point when the rotation angle is less than the angle threshold, and generate an (i+1)th first sub-video between the two POIs.

The video acquisition device continues to perform video acquisition from the ith video acquisition interruption point, and determines a relationship between the current rotation angle and the angle threshold in real time. If the rotation angle is less than the angle threshold, it indicates that the video acquisition device may be in the straight-line region, and acquisition for the curve region has been completed. Accordingly, current acquisition of the (i+1)th first sub-video is stopped (the (i+1)th first sub-video is a first sub-video corresponding to the curve region), and the current position of the video acquisition device is determined as the (i+1)th video acquisition interruption point. Further, acquisition is continued from the (i+1)th video acquisition interruption point, and the relationship between the rotation angle and the angle threshold is determined in real time until the destination POI is reached.

Figure 10:
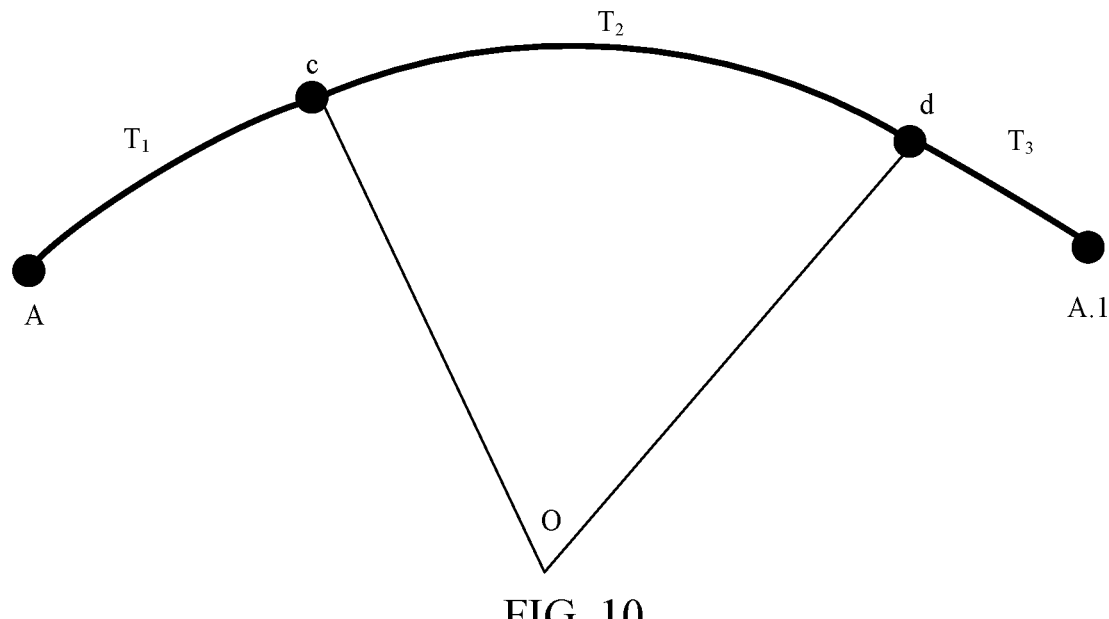
FIG. 10 is a schematic diagram of a video acquisition process according to an exemplary embodiment of this application.

Schematically, FIG. 10 is a schematic diagram of the video acquisition process according to an exemplary embodiment of this application. If there are two straight line parts and a curve part between the POI A and the POI A.1, the video acquisition process is as follows. The video acquisition device starts video acquisition from the POI A, and obtains a current rotation angle in real time. After a point a is reached after time $T_1$, it is determined that the rotation angle is greater than the angle threshold, the point a is determined as a first video acquisition interruption point, and a first sub-video 1 from the POI A to the point a is generated. Acquisition of a first sub-video 2 is continued from the point a. After a point b is reached after time $T_2$, the current rotation angle is less than the angle threshold, the point b is determined as a second video acquisition interruption point, and the first sub-video 2 from the point a to the point b is generated. Acquisition of a first sub-video 3 is continued from the point b. After the POI A.1 is reached after time T3, the first sub-video 3 is generated, and the video acquisition process between the POI A and the POI A.1 is completed.

Step 804: Stop video acquisition when the destination POI is reached, to generate the at least one first sub-video corresponding to the two POIs.

In a possible implementation, video acquisition is performed according to the foregoing video acquisition method, and video acquisition is stopped when the destination POI is reached, to obtain the at least one first sub-video corresponding to the two POIs.

In some embodiments, after the first sub-video between the two POIs is acquired according to the foregoing video acquisition method, a first sub-video between other POIs in the POI route relationship graph may continue to be acquired according to the foregoing video acquisition method. When acquisition for each POI in the POI route relationship graph is completed, a video acquisition process of a panoramic video corresponding to the indoor scene is completed.

In some embodiments, if a plurality of first sub-videos are acquired between the two POIs, the plurality of first sub-videos are numbered according to an acquisition sequence, and each first sub-video is labeled with a route origin position and a route destination position of a corresponding first navigation route, to facilitate a subsequent navigation video generation process of a cloud server.

In some embodiments, in order to reduce the processing pressure of the cloud server, the video acquisition device generates a reverse sub-video of an opposite direction based on the acquired first sub-video. In a possible implementation, after the first sub-video between the two POIs is obtained, reversing and flipping processing may be performed on the at least one first sub-video to generate a reverse sub-video corresponding to the two POIs, a route direction of a navigation route corresponding to the reverse sub-video being opposite to that of a navigation route corresponding to the first sub-video. Both the reverse sub-video and the first sub-video are uploaded to the cloud server, such that the cloud server may generate a navigation video in the navigation video generation process based on the reverse sub-video for a navigation route opposite to the route direction indicated in the POI route relationship graph.

Step 805: Transmit at least one first sub-video corresponding to the POI route relationship graph to the cloud server when acquisition for each navigation route in the POI route relationship graph is completed.

An implementation of step 805 may refer to the foregoing embodiment, and will not be elaborated in this embodiment.

In this embodiment, the POI route relationship graph of a directed acyclic topology is generated, and video acquisition is performed according to the POI route relationship graph, so that repeated acquisition of the first sub-video between the two POIs by the video acquisition device can be avoided, and acquisition costs of the video acquisition device can be reduced. In addition, reversing and flipping processing is performed on the generated first sub-video to generate the reverse sub-video, so that video acquisition pressure of the video acquisition device can be reduced while meeting a reverse navigation requirement.

Figure 11:
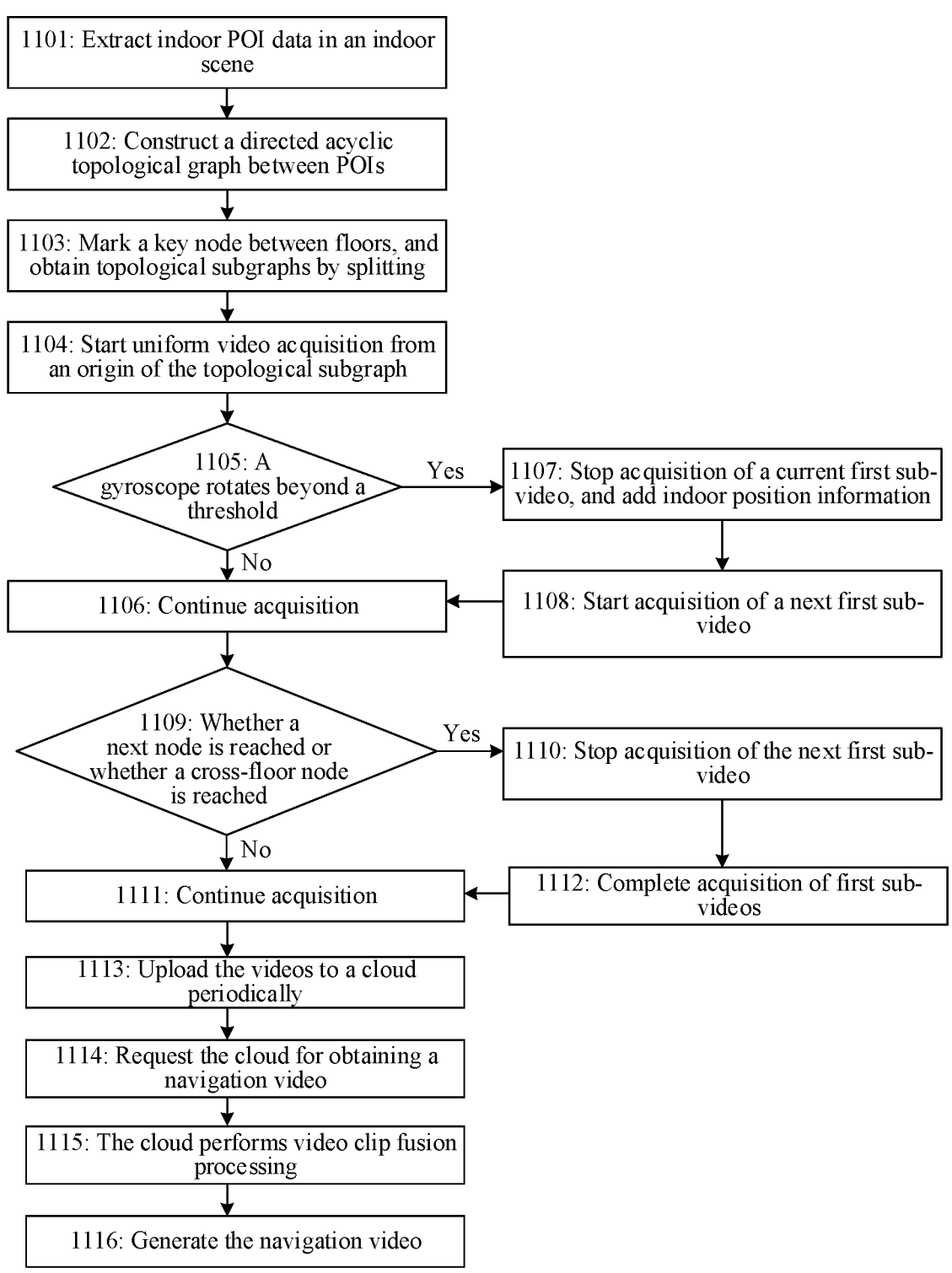
FIG. 11 is a flowchart of a navigation video generation method according to an exemplary embodiment of this application.

Refer to FIG. 11. FIG. 11 is a flowchart of a navigation video generation method according to an exemplary embodiment of this application. The method includes the following steps.

Step 1101: Extract indoor POI data in an indoor scene.

All indoor POI data that may be used in a navigation scene in the indoor scene is acquired in advance. The POI data may include a position, a name, basic information, and the like of each POI.

Step 1102: Construct a directed acyclic topological graph between POIs.

The directed acyclic topological graph is the POI route relationship graph in the foregoing embodiment.

Step 1103: Mark a key node between floors, and obtain topological subgraphs by splitting.

All indoor POI key nodes crossing floors are marked in the topological graph (the POI route relationship graph), and the completed topological graph is split, based on the key nodes, into a plurality of topological subgraphs including the key nodes.

Step 1104: Start uniform video acquisition from an origin of the topological subgraph.

Video acquisition devices corresponding to the quantity of the topological subgraphs are prepared to start, for each topological subgraph, uniform acquisition from an origin POI.

Step 1105: A gyroscope rotates beyond a threshold.

When a rotation angle acquired by the gyroscope exceeds an angle threshold, step 1107 is performed to stop acquisition of a current first sub-video, obtain a current position of the video acquisition device, and add indoor position information to the first sub-video.

Step 1106: Continue acquisition.

Step 1107: Stop acquisition of the current first sub-video, and add the indoor position information.

Step 1108: Start acquisition of a next first sub-video.

Step 1109: Determine whether a next node is reached or whether a cross-floor node is reached.

When the next acquisition node is reached, for example, a POI or a cross-floor POI, step 1110 may be performed to stop acquisition of the next first sub-video.

Step 1110: Stop acquisition of the next first sub-video.

Step 1111: Continue acquisition.

Step 1112: Complete acquisition of first sub-videos.

In a video acquisition process, if the rotation angle of the gyroscope of the video acquisition device exceeds the threshold, acquisition of the current first sub-video is stopped, the current first sub-video is numbered, and indoor position coordinate information corresponding to the current device is added. The current sub-video indicates a video acquired for a straight road section. Meanwhile, acquisition of the next first sub-video is started. When the rotation angle of the gyroscope is fixed, acquisition of the next first sub-video is stopped. The next first sub-video is a video acquired for a turning road section.

Step 1113: Upload the videos to a cloud periodically.

Acquisition is continued along the topological subgraph. For sufficient storage space of the video acquisition device, the acquired first sub-videos are periodically uploaded to the cloud for processing.

Step 1114: Request the cloud for obtaining a navigation video.

Step 1115: The cloud performs video clip fusion processing.

Step 1116: Generate the navigation video.

When a user needs to obtain a video clip of a navigation route between two places in the indoor scene, the cloud may generate a corresponding navigation video by using a multichannel video fusion policy based on the topological graph.

The below is an apparatus embodiment of this application. Details that are not described in the apparatus embodiment may refer to the method embodiment.

Figures 12, 13:
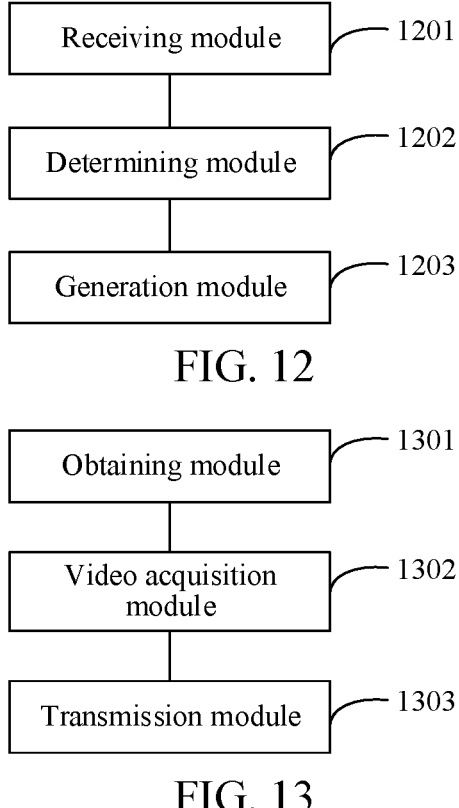
FIG. 12 is a block diagram of a structure of a navigation video generation apparatus according to an exemplary embodiment of this application.
FIG. 13 is a block diagram of a structure of a navigation video acquisition apparatus according to an exemplary embodiment of this application.

FIG. 12 is a block diagram of a structure of a navigation video generation apparatus according to an exemplary embodiment of this application. The apparatus includes:

a receiving module 1201, configured to receive a navigation video obtaining request, the navigation video obtaining request being used for requesting to obtain a navigation video from a route origin to a route destination in an indoor scene;

a determining module 1202, configured to determine, based on the route origin and the route destination, a second sub-video from at least one first sub-video corresponding to a POI route relationship graph, the POI route relationship graph being used for indicating a navigation route between at least two POIs in the indoor scene, the first sub-video being a navigation video for the navigation route, and the route origin and the route destination belonging to the POI route relationship graph; and a generation module 1203, configured to generate the navigation video from the route origin to the route destination based on the second sub-video.

In some embodiments, different first sub-videos correspond to different first navigation routes.

The determining module 1202 is further configured to:

determine a second navigation route from the POI route relationship graph based on the route origin and the route destination, the second navigation route being from the route origin to the route destination; and determine a first sub-video corresponding to the first navigation route as the second sub-video when there is an overlapping navigation route between the first navigation route and the second navigation route.

In some embodiments, the generation module 1203 is further configured to:

perform, when the overlapping navigation route completely overlaps the first navigation route, video stitching on the second sub-video to generate the navigation video from the route origin to the route destination; or perform, when the overlapping navigation route does not completely overlap the first navigation route, video clipping on the second sub-video to generate a video clip, and perform video stitching on the video clip to generate the navigation video from the route origin to the route destination.

In some embodiments, the overlapping navigation route is a straight line.

The generation module 1203 is further configured to:

determine first video clip duration based on a first route length, a second route length, and sub-video duration, the first route length being a route length of the overlapping navigation route, the second route length being a route length of the first navigation route, and the sub-video duration being video duration of the second sub-video; and perform video clipping on the second sub-video based on the first video clip duration to generate the video clip.

In some embodiments, the overlapping navigation route is a curve.

The generation module 1203 is further configured to:

determine a curve center position and a first central angle of the first navigation route;

determine a second central angle of the overlapping navigation route based on the overlapping navigation route and the curve center position;

determine second video clip duration based on the second central angle, the first central angle, and sub-video duration, the sub-video duration being video duration of the second sub-video; and perform video clipping on the second sub-video based on the second video clip duration to generate the video clip.

In some embodiments, the POI route relationship graph is a directed acyclic topological graph.

The determining module 1202 is further configured to:

determine the first sub-video corresponding to the first navigation route as the second sub-video when there is the overlapping navigation route between the first navigation route and the second navigation route and a route direction of the overlapping navigation route is the same as that of the first navigation route.

The determining module 1202 is further configured to determine a reverse sub-video corresponding to the first navigation route as the second sub-video when there is the overlapping navigation route between the first navigation route and the second navigation route and a route direction of the overlapping navigation route is opposite to that of the first navigation route, the reverse sub-video being obtained by performing reversing and flipping processing on the first sub-video.

In summary, in this embodiment of this application, in an indoor navigation scene, a first sub-video corresponding to a navigation route between two POIs in the indoor scene is acquired in advance. When a user needs to request for a corresponding navigation video in the indoor scene, the first sub-video is screened based on a route origin and a route destination that are indicated in a navigation video request, to generate the navigation video required by the user. In an indoor navigation process, a panoramic picture in the indoor scene is acquired in advance, user equipment is not required to acquire the panoramic picture in real time. On one hand, this can reduce power consumption of the user equipment. On the other hand, the navigation video obtained by the user is not affected by a position of the user. That is, the user can view a navigation picture between any two positions in the indoor scene in advance even if outside the indoor scene. Therefore, the navigation video can be previewed, a reference is provided for the user to plan a route ahead, and application scenes of panoramic navigation are further enriched.

FIG. 13 is a block diagram of a structure of a navigation video acquisition apparatus according to an exemplary embodiment of this application. The apparatus includes:

an obtaining module 1301, configured to obtain a POI route relationship graph of an indoor scene, the POI route relationship graph being used for indicating a navigation route between at least two POIs in the indoor scene;

a video acquisition module 1302, configured to perform video acquisition in a manner of moving between two POIs according to a navigation route, indicated by the POI route relationship graph, between the two POIs, to generate at least one first sub-video corresponding to the navigation route; and a transmission module 1303, configured to transmit at least one first sub-video corresponding to the POI route relationship graph to a cloud server when acquisition of each navigation route in the POI route relationship graph is completed, the cloud server being configured to determine, in response to receiving a navigation video obtaining request, a second sub-video from the at least one first sub-video corresponding to the POI route relationship graph based on a route origin and a route destination that are indicated by the navigation route obtaining request, and generate a navigation video from the route origin to the route destination based on the second sub-video.

In some embodiments, the POI route relationship graph is a directed acyclic topological graph.

The video acquisition module 1302 is further configured to:

determine an origin POI and a destination POI from the two POIs based on a route direction of the navigation route in the POI route relationship graph;

perform video acquisition in the route direction by taking the origin POI as a video acquisition starting point; and stop video acquisition when the destination POI is reached, to generate the at least one first sub-video corresponding to the two POIs.

In some embodiments, the video acquisition module 1302 is further configured to:

obtain a current rotation angle of a video acquisition device in a video acquisition process;

determine an ith video acquisition interruption point when the rotation angle is greater than an angle threshold, and generate an ith first sub-video between the two POIs, i being a positive integer; and continue to perform video acquisition from the ith video acquisition interruption point, determine an (i+1)th video acquisition interruption point when the rotation angle is less than the angle threshold, and generate an (i+1)th first sub-video between the two POIs.

In some embodiments, the apparatus further includes:

a generation module, configured to perform reversing and flipping processing on the at least one first sub-video to generate at least one reverse sub-video corresponding to the two POIs, a route direction of a navigation route corresponding to the reverse sub-video being opposite to that of the navigation route corresponding to the first sub-video.

In some embodiments, the obtaining module 1301 is further configured to:

obtain navigation data of the indoor scene; and generate the POI route relationship graph of the indoor scene based on the navigation data.

In summary, in this embodiment of this application, the video acquisition device acquires the plurality of first sub-videos corresponding to the POI route relationship graph in advance according to the POI route relationship graph of the indoor scene, and uploads the first sub-videos to the cloud server, such that the cloud server may screen the first sub-videos based on the route origin and the route destination that are indicated in the navigation video obtaining request, to generate the navigation video required by the user. In an indoor navigation process, a panoramic picture in the indoor scene is acquired in advance, user equipment is not required to acquire the panoramic picture in real time. On one hand, this can reduce power consumption of the user equipment. On the other hand, the navigation video obtained by the user is not affected by a position of the user. That is, the user can view a navigation picture between any two positions in the indoor scene in advance even if outside the indoor scene. Therefore, the navigation video can be previewed, a reference is provided for the user to plan a route ahead, and application scenes of panoramic navigation are further enriched.

An embodiment of this application provides a computer device. The computer device includes a processor and a memory. The memory stores at least one piece of program. The at least one piece of program is loaded and executed by the processor to implement the navigation video generation method provided in the foregoing optional implementation or implement the navigation video acquisition method provided in the foregoing optional implementation. In some embodiments, the computer device may be a video acquisition device, or may be a server or cloud server.

When the computer device is the video acquisition device, the video acquisition device may be configured to perform the navigation video acquisition method for a video acquisition device side in the foregoing optional implementation. When the computer device is the server or cloud server, the server or cloud server may be configured to perform the navigation video generation method for a cloud server side in the foregoing optional implementation.

Figure 14:
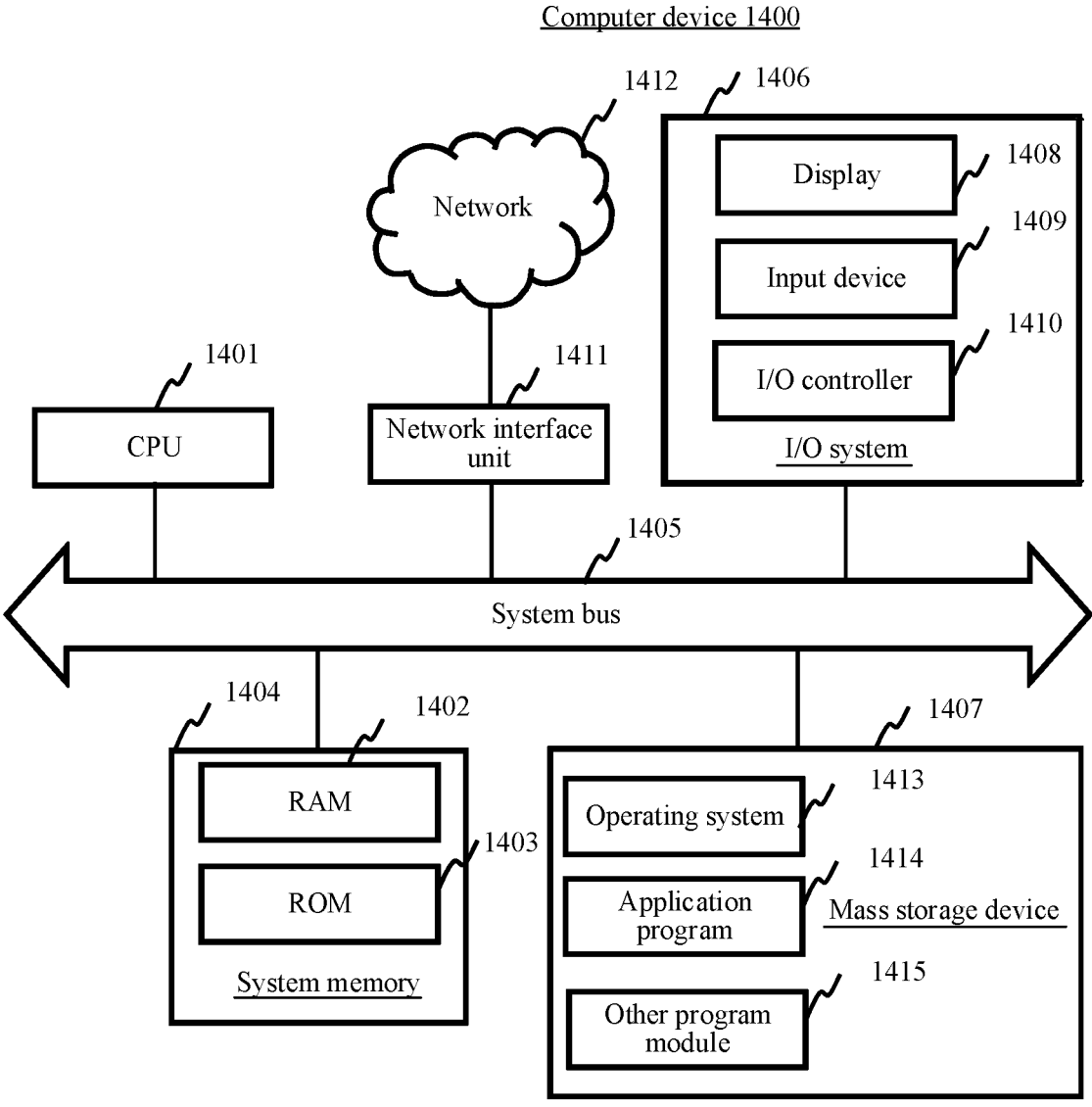
FIG. 14 is a schematic diagram of a structure of a server according to an embodiment of this application.

Refer to FIG. 14. FIG. 14 is a schematic diagram of a structure of a computer device according to an exemplary embodiment of this application. The computer device 1400 includes a central processing unit (CPU) 1401, a system memory 1404 including a random access memory (RAM) 1402 and a read-only memory (ROM) 1403, and a system bus 1405 that connects the system memory 1404 to the CPU 1401. The computer device 1400 further includes a basic input/output (I/O) system 1406 that helps information transmission between devices in a computer, and a mass storage device 1407 configured to store an operating system 1413, an application program 1414, and another program module 1415.

The basic I/O system 1406 includes a display 1408 configured to display information and an input device 1409 configured for a user to input information, for example, a mouse or a keyboard. Both the display 1408 and the input device 1409 are connected to the CPU 1401 through an I/O controller 1410 connected to the system bus 1405. The basic I/O system 1406 may further include the I/O controller 1410 configured to receive and process inputs of a plurality of other devices such as the keyboard, the mouse, or an electronic stylus. Similarly, the I/O controller 1410 further provides an output to a display screen, a printer, or another type of output device.

The mass storage device 1407 is connected to the CPU 1401 through a mass storage controller (not shown) connected to the system bus 1405. The mass storage device 1407 and a computer-readable medium associated therewith provide non-volatile storage for the computer device 1400. That is, the mass storage device 1407 may include a computer-readable medium (not shown) such as a hard disk or a compact disc read-only memory (CD-ROM).

The system memory 1404 and the mass storage device 1407 may be collectively referred to as memories.

According to various embodiments of this application, the computer device 1400 may further be connected to a remote computer on a network for running through the network such as the Internet. That is, the computer device 1400 may be connected to a network 1412 through a network interface unit 1411 connected to the system bus 1405, or may be connected to another type of network or remote computer system (not shown) through the network interface unit 1411.

The memory further includes one or more programs. The one or more programs are stored in the memory, and are configured to be executed by one or more CPUs 1401.

This application also provides a computer-readable storage medium. The readable storage medium stores at least one piece of program. The at least one piece of program is loaded and executed by a processor to implement the navigation video generation method provided in any one of the foregoing exemplary embodiments or implement the navigation video acquisition method provided in any one of the foregoing exemplary embodiments.

An embodiment of this application provides a computer program product or computer program. The computer program product or computer program includes computer instructions. The computer instructions are stored in a computer-readable storage medium. A processor of a computer device reads the computer instructions from the computer-readable storage medium. The processor executes the computer instructions, such that the computer device performs the navigation video generation method provided in the foregoing optional implementation or implements the navigation video acquisition method provided in the foregoing optional implementation.

It may be understood by a person of ordinary skill in the art that all or part of the steps in the foregoing embodiments may be completed by hardware, or by a computer instructing related hardware. The program may be stored in a computer-readable storage medium. The storage medium may be a ROM, a magnetic disk, an optical disk, or the like.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The foregoing descriptions are merely optional embodiments of this application and not intended to limit this application. Any modification, equivalent replacement, or improvement made within the spirit and principle of this application shall fall within the protection scope of this application.

What is claimed is:

1. A method for providing a navigation video performed by a computer device, the method comprising:
   receiving, from a terminal, a navigation video obtaining request, the navigation video obtaining request including a route origin and a route destination within an indoor scene;
   determining a target navigation route from the route origin to the route destination from a point of interest (POI) route relationship graph based on the route origin and the route destination, the POI route relationship graph corresponding to at least one candidate sub-video, different candidate sub-videos corresponding to different candidate navigation routes between at least two POIs in the indoor scene, the route origin and the route destination being located on at least one of the candidate navigation routes in the POI route relationship graph;
   determining a candidate sub-video corresponding to a candidate navigation route as a target sub-video when there is an overlapped portion between the candidate navigation route and the target navigation route; and
   generating a target navigation video from the route origin to the route destination based on the target sub-video, wherein when the candidate navigation route is not completely overlapped with the target navigation route and the overlapped portion is a curve, the target navigation video is generated based at least by:
      determining a curve center position and a candidate central angle of the candidate navigation route,
      determining a target central angle of the overlapped portion based on the curve center position and the overlapped portion,
      performing video clipping on the target sub-video based on the target central angle and the candidate central angle to generate a video clip corresponding to the overlapped portion, and
      performing video stitching on the video clip to generate the target navigation video from the route origin to the route destination.

2. The method according to claim 1, wherein when the candidate navigation route is not completely overlapped with the target navigation route and the overlapped portion is a straight line, the target navigation video is generated based at least by:
   determining first video clip duration based on a first route length, a second route length, and a sub-video duration, the first route length corresponding to the overlapped portion between the candidate navigation route and the target navigation route, the second route length corresponding to the candidate navigation route, and the sub-video duration being a video duration of the target sub-video;
   performing video clipping on the target sub-video based on the first video clip duration to generate a second video clip; and
   performing video stitching on the second video clip to generate the target navigation video from the route origin to the route destination.

3. The method according to claim 1, wherein the POI route relationship graph is a directed acyclic topological graph;
   the determining a candidate sub-video corresponding to a candidate navigation route as a target sub-video when there is an overlapped portion between the candidate navigation route and the target navigation route comprises:

determining the candidate sub-video corresponding to the candidate navigation route as the target sub-video when a direction of the overlapped portion between the candidate navigation route and the target navigation route is the same as that of the candidate navigation route.

4. The method according to claim 3, further comprising:

determining a reverse sub-video corresponding to the candidate navigation route as the target sub-video when the direction of the overlapped portion between the candidate navigation route and the target navigation route is opposite to that of the candidate navigation route.

5. A computer device comprising a processor and a memory, the memory storing at least one piece of computer program that, when executed by the processor, causes the computer device to implement a method for providing a navigation video including:

receiving, from a terminal, a navigation video obtaining request, the navigation video obtaining request including a route origin and a route destination within an indoor scene;

determining a target navigation route from the route origin to the route destination from a point of interest (POI) route relationship graph based on the route origin and the route destination, the POI route relationship graph corresponding to at least one candidate sub-video, different candidate sub-videos corresponding to different candidate navigation routes between at least two POIs in the indoor scene, the route origin and the route destination being located on at least one of the candidate navigation routes in the POI route relationship graph;

determining a candidate sub-video corresponding to a candidate navigation route as a target sub-video when there is an overlapped portion between the candidate navigation route and the target navigation route; and generating a target navigation video from the route origin to the route destination based on the target sub-video, wherein when the candidate navigation route is not completely overlapped with the target navigation route and the overlapped portion is a curve, the target navigation video is generated based at least by:

determining a curve center position and a candidate central angle of the candidate navigation route, determining a target central angle of the overlapped portion based on the curve center position and the overlapped portion, performing video clipping on the target sub-video based on the target central angle and the candidate central angle to generate a video clip corresponding to the overlapped portion, and performing video stitching on the video clip to generate the target navigation video from the route origin to the route destination.

6. The computer device according to claim 5, wherein when the candidate navigation route is not completely overlapped with the target navigation route and the overlapped portion is a straight line, the target navigation video is generated based at least by:

determining first video clip duration based on a first route length, a second route length, and a sub-video duration, the first route length corresponding to the overlapped portion between the candidate navigation route and the target navigation route, the second route length corresponding to the candidate navigation route, and the sub-video duration being a video duration of the target sub-video;

performing video clipping on the target sub-video based on the first video clip duration to generate a second video clip; and performing video stitching on the video clip to generate the target navigation video from the route origin to the route destination.

7. The computer device according to claim 5, wherein the POI route relationship graph is a directed acyclic topological graph;

the determining a candidate sub-video corresponding to a candidate navigation route as a target sub-video when there is an overlapped portion between the candidate navigation route and the target navigation route comprises:

determining the candidate sub-video corresponding to the candidate navigation route as the target sub-video when a direction of the overlapped portion between the candidate navigation route and the target navigation route is the same as that of the candidate navigation route.

8. The computer device according to claim 7, wherein the method further comprises:

determining a reverse sub-video corresponding to the candidate navigation route as the target sub-video when the direction of the overlapped portion between the candidate navigation route and the target navigation route is opposite to that of the candidate navigation route.

9. A non-transitory computer-readable storage medium, storing at least one piece of program that, when executed by a processor of a computer device, causes the computer device to implement a method for providing a navigation video including:

receiving, from a terminal, a navigation video obtaining request, the navigation video obtaining request including a route origin and a route destination within an indoor scene;

determining a target navigation route from the route origin to the route destination from a point of interest (POI) route relationship graph based on the route origin and the route destination, the POI route relationship graph corresponding to at least one candidate sub-video, different candidate sub-videos corresponding to different candidate navigation routes between at least two POIs in the indoor scene, the route origin and the route destination being located on at least one of the candidate navigation routes in the POI route relationship graph;

determining a candidate sub-video corresponding to a candidate navigation route as a target sub-video when there is an overlapped portion between the candidate navigation route and the target navigation route; and generating a target navigation video from the route origin to the route destination based on the target sub-video, wherein when the candidate navigation route is not completely overlapped with the target navigation route and the overlapped portion is a curve, the target navigation video is generated based at least by:

determining a curve center position and a candidate central angle of the candidate navigation route, determining a target central angle of the overlapped portion based on the curve center position and the overlapped portion, performing video clipping on the target sub-video based on the target central angle and the candidate central angle to generate a video clip corresponding to the overlapped portion, and performing video stitching on the video clip to generate the target navigation video from the route origin to the route destination.

10. The non-transitory computer-readable storage medium according to claim 9, wherein when the candidate navigation route is not completely overlapped with the target navigation route and the overlapped portion is a straight line, the target navigation video is generated based at least by:

determining first video clip duration based on a first route length, a second route length, and a sub-video duration, the first route length corresponding to the overlapped portion between the candidate navigation route and the target navigation route, the second route length corresponding to the candidate navigation route, and the sub-video duration being a video duration of the target sub-video;

performing video clipping on the target sub-video based on the first video clip duration to generate a second video clip; and performing video stitching on the second video clip to generate the target navigation video from the route origin to the route destination.

11. The non-transitory computer-readable storage medium according to claim 9, wherein the POI route relationship graph is a directed acyclic topological graph;

the determining a first candidate sub-video corresponding to a first-candidate navigation route as a second target sub-video when there is an overlap overlapped portion between the candidate navigation route and the target navigation route comprises:

determining the candidate sub-video corresponding to the candidate navigation route as the target sub-video when a direction of the overlapped portion between the candidate navigation route and the target navigation route is the same as that of the candidate navigation route.

\* \* \* \* \*